COMMUNICATION MULTIPLEXING APPARATUS

Filed Sept. 11, 1967 5 Sheets-Sheet 1

INVENTOR
ROBERT G. CARLETON

BY Faith F. Driscoll

ATTORNEY

INVENTOR
ROBERT G. CARLETON
BY Faith F. Driscoll
ATTORNEY

COMMUNICATION MULTIPLEXING APPARATUS

Filed Sept. 11, 1967 5 Sheets-Sheet 3

INVENTOR
ROBERT G. CARLETON
BY Faith F. Driscoll
ATTORNEY

COMMUNICATION MULTIPLEXING APPARATUS

Filed Sept. 11, 1967 5 Sheets-Sheet 4

INVENTOR
ROBERT G. CARLETON
BY
ATTORNEY

COMMUNICATION MULTIPLEXING APPARATUS

INVENTOR
ROBERT G. CARLETON
BY Faith F. Driscoll
ATTORNEY

United States Patent Office 3,500,466
Patented Mar. 10, 1970

3,500,466
COMMUNICATION MULTIPLEXING APPARATUS

Robert G. Carleton, Needham, Mass., assignor to Honeywell Inc., Minneapolis, Minn., a corporation of Delaware Filed Sept. 11, 1967, Ser. No. 666,726
Int. Cl. H04j *3/00*
U.S. Cl. 340—172.5 11 Claims

ABSTRACT OF THE DISCLOSURE

Communication multiplexor apparatus for connecting a plurality of digital communication lines each adapted to supply and receive information a bit at a time to and from a data processor. The multiplexor apparatus includes a bit processor for effecting a transfer of information a bit at a time to and from the communication lines and a character processor which is operative to effect a transfer of assembled characters to and from the data processor. A control memory which stores data and control information pertinent to he processing of data from each of the lines is time multiplexed between the two processors on an alternate cycle basis. The character processor is operative only upon the recognition of one or more special control characters from a particular line, previously conditined for receiving data by the data processor, to transfer to the date processor further assembled data characters from that line by the bit processor to the processing. Communications between the two processors of the multiplexor apparatus is established indirectly through a shared common segment of memory thereby permitting each processor to operate independently.

BACKGROUND OF THE INVENTION

This invention relates to multiplexor apparatus and more particularly to a communications multiplexor which is operative to assemble bits from a plurality of communication lines for subsequent transfer to a data processor, such transfer being conditioned upon the recognition of one or more special characters.

In order to coordinate the transfer of data between a plurality of communication line terminals and a data processor, frequently a data terminal station in effecting the data transmission via a communications line may generate control signals in the form of special characters insert character sequences in appropriate positions of a message. This provides some means of coordinating the operation of the source of data and the receiving units. Thus, the receiving unit is required oftentimes to recognize one or more special control characters before the unit recognizes such transmission as constituting a legal message whereupon the unit is then operative to transfer subsequently received information to the data processor. When the unit has recognized that required number of special characters have been received from a particular line, the receiving line is termed to be in "sync" with its data source.

Some prior art communication multiplexors have employed wired logic to effect the necessary code and control character recognition for each communication line. This procedure although more rapid than other procedures has proved costly and very inflexible. Further, since the multiplexor must allocate time to the performance of the specific tasks relating to character recognition for a plurality of lines of various types (asynchronous and synchronous) having different recognition requirements, less time is available for the important task of assembling and disassembling of data to and from said lines. More specifically, for asynchronous lines, the transfer of data to the data processor begins subsequent to the recognition of a first special control character. While for synchronous lines, oftentimes the receiving unit must recognize having received the two special control characters in succession before the line is considered to be in an "in sync" condition. Thereafter, all non-sync characters are transferred to the data processor.

The second arrangement employed by many which is more flexible than the first performs the above synchronization or recognition by a stored program within a processing computer. However, the latter has been found to be extremely time consuming and in some cases inefficient unless the processing computer includes special character handling instructions.

SUMMARY OF INVENTION

In order to overcome the above-mentioned disadvantages in accordance with the subject invention, there is provided a novel communications multiplexor which includes a first processor for effecting the assembling and disassembling of data bits from a plurality of communications lines and a second processor for effecting the transfer of data characters between the first processor and the data processor subsequent to the receipt of one or more special control characters. The latter is effected in a manner as to minimize the amount of time the first processor must allocate to the synchronization task, this task being assigned primarily to the second processor thereby enabling the first processor to allocate more of its time to the scanning of the communication lines. Thus the first processor is able to process a greater number of bits from each of the lines resulting in greater system throughput.

In accordance with a preferred embodiment of the subject invention, a bit processor is operative to effect the assembling of bits from a plurality of communication lines in accordance with control information stored in an associated control memory. The processor upon finding the boundary for a particular character during the assembling of bits on a particular line is operative to effect the transfer of the subsequently assembled character to the control memory. In some instances, the bit processor effects the establishment of the character boundary by comparing the bits received from each line "with a stored special control character" after the receipt of a further bit from that line.

The second processor upon referencing the assembled data characters of a particular line from control memory is operative to compare the character with the stored special control character in control memory. In accordance with a favorable comparison therebetween, the processor is operative to modify, in a predetermined manner, a control order word referenced by the bit processor during the bit assembling process. The bit processor upon the subsequent referencing of this control order word is conditioned in accordance with the modification to transfer a second assembled character received from that line without effecting a comparison of subsequently received bits with the aforementioned stored special control character.

If the particular communication receiving line involved requires only the recognition of a single special control character to effect the establishment of a "in sync" condition for that line (asynchronous as well as some types of synchronous lines), the second processor is operative in accordance with a first favorable comparison to modify a second order control word referenced by that processor during the processing of characters whereby subsequently assembled data characters are transferred to the data processor.

If the terminal associated with the receiving line requires the communications multiplexor to recognize the reception of two special control characters successively (synchronous lines), the second order control word referenced by the character processor is only altered upon the recognition of a second special control character from that line.

Irrespective of what the requirements may be with respect to the establishment of a "in sync" condition for a particular line, the bit processor is seen to perform only those operations necessary to the defining of a character boundary, while the character processor is seen to perform those functions in accordance with the requirements of a particular line relating to the establishment of an "in sync" condition for each of the lines. Thus, the above arrangement is seen to minimize the amount of time allocated by the bit processor to the establishment of synchronization between receiving lines and the communications multiplexor. The bit processor in some instances is operative to effect a comparison of received bits with a stored special control character only to establish a boundary for a first character received from a particular line.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

DESCRIPTION OF THE PREFERRED EMBODIMENT

Figure 1:
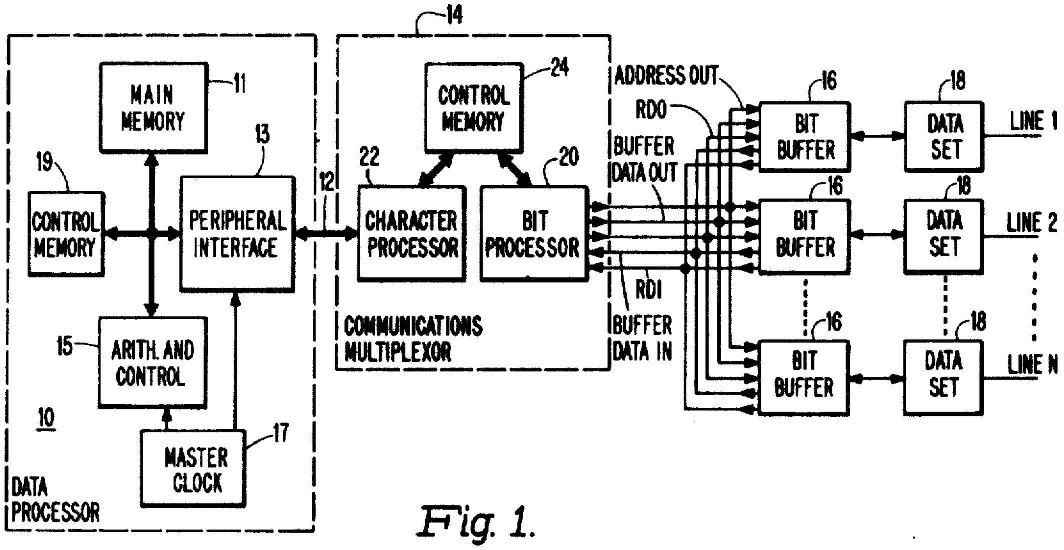
FIGURE 1 is a diagrammatic representation of a data processing system employing the principles of the subject invention.

Referring first to FIGURE 1, there is shown an electronic data processing system constructed in accordance with the principles of the invention which comprises a data processor 10 coupled to receive or transmit data characters over an input channel 12 through a communications multiplexor 14. The latter is adapted to receive and transmit information a bit at a time between a plurality of communication lines 1–N connected to the bit processor 20 through individual line terminations 18, each of which is further connected to the individual bit buffers 16.

The data processor 10 generally may be of any type and more particularly, may comprise a processor having a peripheral interface which includes a "cycle stealing" capability; this capability refers to an arrangement which permits a peripheral device access to the data processor's memory during a given memory cycle time interval thereby precluding the arithmetic unit of such processor from operating during that particular time interval. A system incorporating the above mentioned feature is disclosed in Patent 3,323,110 to Louis Oliari and Robert Fischer, assigned to the assignee of the subject invention.

As illustrated in FIGURE 1, the data processor 10 includes a control memory 19, a main memory 11, and arithmetic and control portion 15. The data processor 10 further includes a suitable program control means designated as a peripheral interface 20 which is provided to operatively connect both the main memory and control memory by way of a data and control bus 15 to the multiplexor 14. A master clock 17 is operative to synchronize the various data transfers within the system. In the particular system disclosed by Patent 3,323,110 as well as in the subject embodiment, preliminary to the transfer of a character of information, a channel inquiry signal is directed to the particular peripheral device allocated the succeeding memory cycle and a response is generated by the device i.e. multiplexor 14 which has been returned to the processor 10 for the interpretation thereof. The type of responses which may be generated by the device are those indicating a frame-output or frame-input demand which initiates the reading or writing to the peripheral device or data processor respectively.

Such responses may be seen also to include or expanded to include those necessary to effect the loading of an address into the read-write channel assigned to the peripheral device, the source of such address being the peripheral device itself. This arrangement enables the peripheral device to direct a data character assembled by such device within a memory location of a particular memory area in the main memory of the data processor. With respect to the subject arrangement the multiplexor 14, by being able to direct an address into the read-write channel assigned thereto, during successively assigned memory cycles, is able to effect the assembling or disassembling of messages within the processor's memory thereby eliminating the requirement for additional message storage for each communications line within the multiplexor 14. Further, the storing of address information by multiplexor 14 in contrast to requiring the data processor 10 to store such information has the advantage of eliminating the possibility of restriction of system throughput in that the transfer of each data character assembled by the multiplexor 14 to the data processor 10 does not require program intervention on the part of such processor 10. For further details regarding the assignment of read-write channels and the specific implementation of various portions of the processor 10, reference should be made to the aforementioned patent of Oliari and Fischer.

Each of the bit buffers 16 may include first a flip-flop for storing a single bit of information received from its associated communications line and a second flip-flop for storing one information bit until it is supplied to the communication line. Each bit buffer 16 also includes means for decoding its own address when the address is applied to the address/out lines to all of the bit buffers 16. Each of the buffers 16 is scanned by the multiplexor 14 during which time an address is applied to the address out lines and appropriate action is taken by the multiplexor as a consequence of signals generated by the buffers 16 in response thereto. When the data transfer is to proceed from the bit buffer 16 to the multiplexor 14, the bit buffer when addressed responds by first generating a request demand signal, RDI, after which a bit of information is transferred over the data-line (i.e. buffer data in line of FIGURE 1) associated with such bit buffer to the multiplexor 14. The bit buffer 16 may be also operative when addressed to receive a bit of information over the data out-line (i.e. buffer data out line of FIGURE 1) of the multiplexor 14 subsequent to the generation of an output demand request signal RDO.

The multiplexor 14 is seen to comprise a bit processor 20 and a character processor 22 each coupled to a control memory 24. The control memory 24 may take the form of any well known addressable memories of the coincident type. For example, control memory 24 may comprise a type of multi-plane coincident core storage unit described in Patent 3,201,762 to Henry W. Schrimpf, assigned to the assignee of the subject invention.

Certain sections of the control memory may be preloaded with control information pertinent to the assembling and disassembling of bits received from and transferred to each of the communication lines 1–N.

Figure 1A:
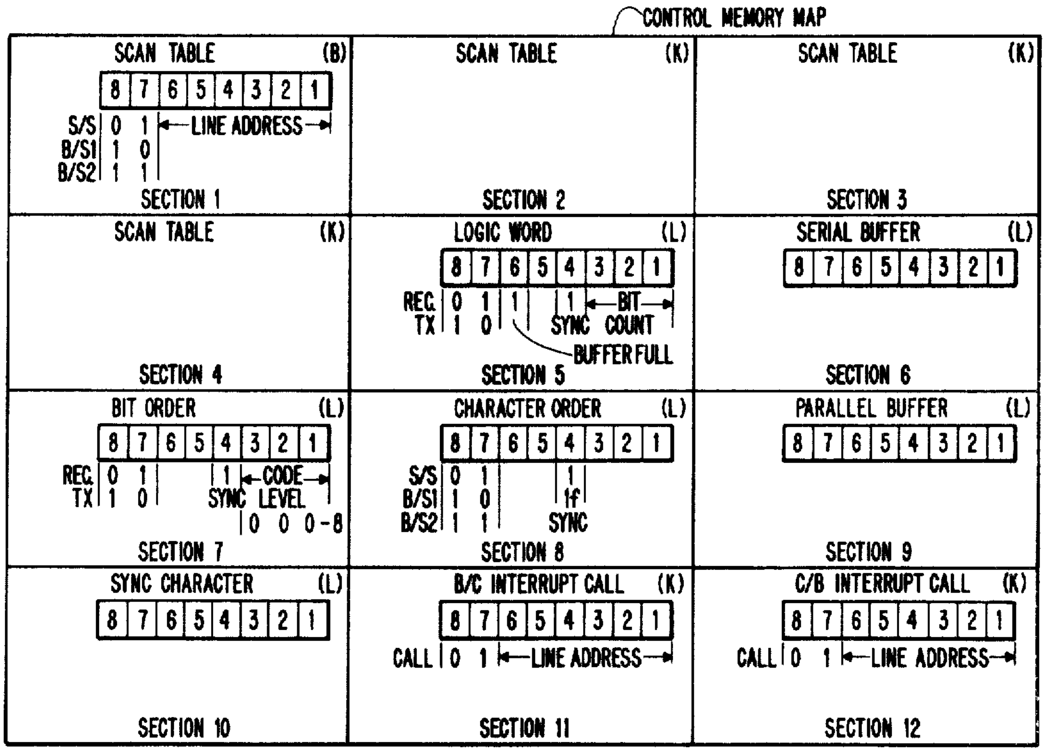
FIGURE 1A illustrates the organization of the control memory of FIGURE 1 and details the formatting of some of the control information stored therein.

Referring now to FIGURE 1A, the organization of the control memory 24 will now be described. The control memory 24 is seen to be divided into a plurality of groups or sections, each section comprising a plurality of character storage locations, a number of which corresponds to the number of communications lines. Some of the sections are organized on a line-address basis; that is, each line is assigned an address or line number to be referred to herein as "line address." The information pertaining to that line corresponds to the storage location within each of the line-oriented sections having the same address. These sections in FIGURE 1A are indicated by an L. The remaining sections are counter oriented sections designed by a C, the significance of the latter will be later apparent.

Of the twelve sections shown in FIGURE 1A, four sections which constitute a scan table are allocated to the storage of scanning information. These sections correspond to Sections 1–4 and control the servicing (i.e. addressing) sequence of the bit-buffers 16 of FIGURE 1. The table may be weighted according to the line speed wherein the frequency of occurrence of a particular line address in the scan table is in proportion to its bit rate of the line in relation to the total bit rate of the unit. For example, if the line receiving data five times as fast as a second line, the address of the faster line occurs five times as often in the scan table as the second line.

The line address entries of the information in the table have a format as shown in Section 1 of FIGURE 1A. The low order 6 bits of the scan table character define the particular line address. The high order two bits of the character indicates the particular line type. The line type indicators are as follows:

01—Start-Stop-Asynchronous—the bits of a character are transferred in serial. On receiving, each character is preceded by a start bit and on transmitting a start bit is generated for each character sent.

10—Bit-Synchronous—the bits of a character are transferred in serial. Two consecutive sync characters are required before reception can take place.

11—Bit-Synchronous—the bits of a character are transferred in serial. A single character is required to be recognized before reception can take place.

The fifth section of control memory 24 is a line oriented section comprising character storage locations for storing a control logic character for each line. Predetermined bit positions of the control logic character indicate whether the line is in a receive or send status (i.e. bit positions 7 and 8), and whether bit synchronization has been effected (i.e. bit position 4). Each logic character further includes a three bit field (i.e. bit positions 1–3) for storing the bit count for the line. Double buffer storage for each line 1–N is provided by the line oriented Sections 6 and 9 of the control memory 24.

The Section 7 line is a line oriented section which is adapted to store a different bit order word for each line in a different one of the N character storage locations which comprise the section. The bit order character for each line is seen to contain 8 bits, three of which are programmed loaded initially. These correspond to the low order 3 bits which designate the character length or code level for each particular line. The state of the two high order bits which denote whether the line is in a send or receive status may be established by an instruction from the data processor 10. The state of the fourth bit position of the bit order character denotes whether or not a first synchronization character has been received from that line. The significance of the latter is discussed in detail below.

A character order character is stored for each line in Section 8 of the control memory 24. The two high order bits of the character order character specifiy the type of line and has the same significance as the corresponding bits of the scan table character associated with Section 1. The fourth bit position of the character order word is also associated with the establishment of an "in sync" condition for a line, the significance of the latter is described below.

A different special control character (sync) may be stored for each line in one of the storage locations of a line oriented Section 10 of control memory 24 while the remaining counter oriented Sections 11 and 12 are used to provide storage for effecting communications between the two processors 22 and 20. In both the Sections, 11 and 12, as shown in the FIGURE 1A the first 6 bits of each character specifies the address of the line involved while the high order two bit positions (8 and 7) indicate the type of action to be taken with respect to that particular line.

Figure 2:
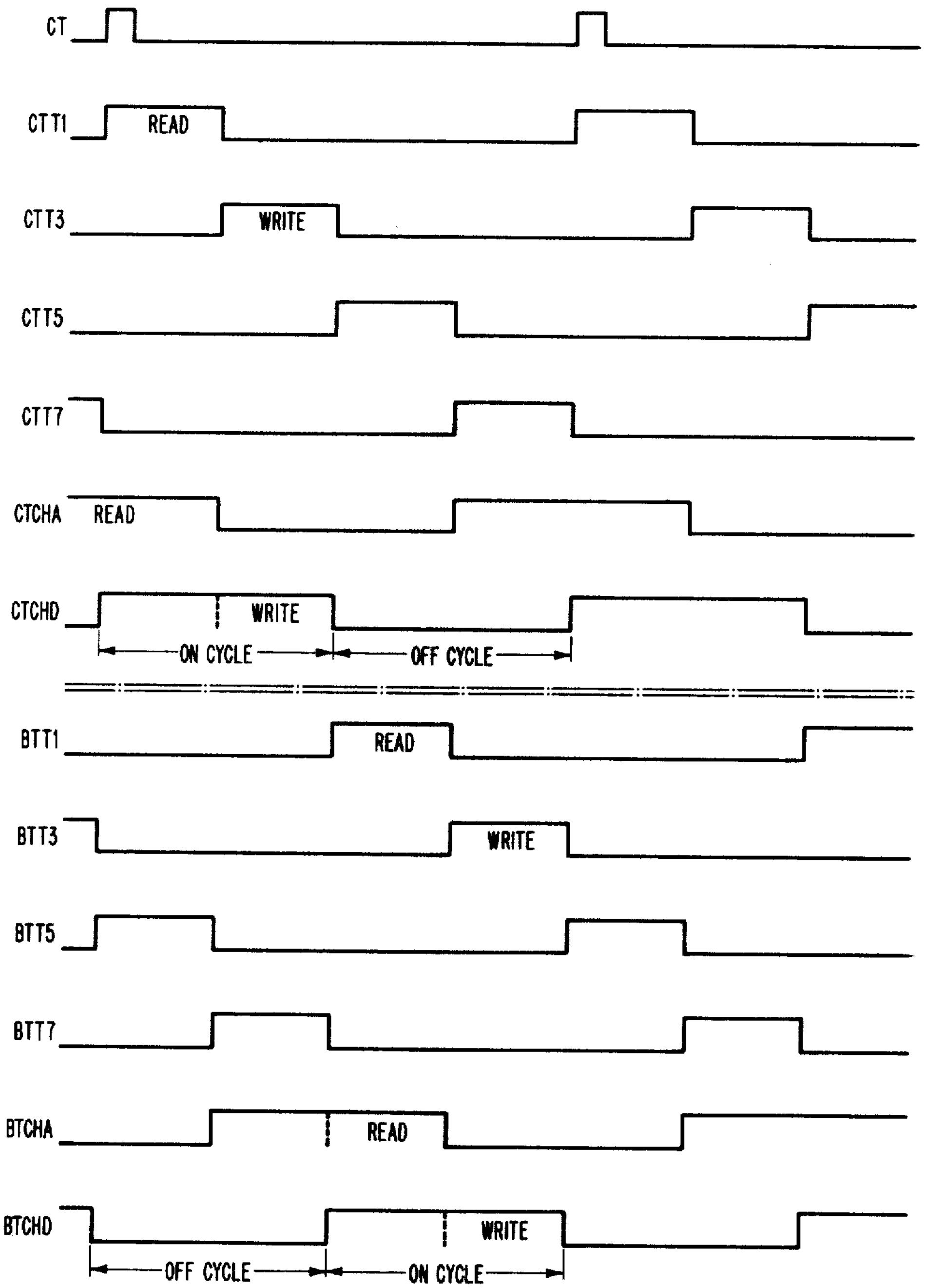
FIGURE 2 is a timing chart pertinent to the cycling of the bit and character processors of FIGURE 1.

The control memory 24 is time multiplexed between the two processors 20 and 22 on an alternate cycle basis. This may be better understood by a consideration of the timing chart of the FIGURE 2. The timing within the multiplexor 14 is derived from timing signals generated by the master clock 17 of the data processor 10 and these timing signals in FIGURE 2 are seen to correspond to the timing signals CT. These signals occur every two microseconds and thereby defining a two microsecond cycle time for each of the processors 22 and 20.

Referring to FIGURE 2, it is seen that each processor cycle is divided into four basic times: T–1, T–3, T–5 and T–7. The upper portion of the FIGURE 2 illustrates the character processor timing while the lower portion of the FIGURE 2 illustrates the bit processor timing wherein each of the individual timing signals are designated with either the prefix CT or BT respectively. The timing of each processor is adjusted to be 180° out of phase with respect to one another. The latter is indicated in FIGURE 2 by the showing of the first half of the character processor cycle T–1 and T–3, as occurring timewise during the last half of the bit processor cycle, T–5 and T–7 and vice versa. Thus, the memory 24 is seen to have a one microsecond read-write cycle time shared between the two processors whereby, as mentioned previously, the effective memory cycle time of each processor corresponds to two microseconds. The signal CHA for both processors is seen to occur during the time T–7–T–1 for each of the processors. During this time the address needed for memory access time at the beginning of each cycle is generated. The signal CHD occurs during the times T–1–T–3 for each processor and it is during this time that the data is either read out of or written into memory 24. The first half of the processor cycle during which time memory may be accessed, is designated in FIGURE 2 as "on cycle" while the last half of the cycle time during which memory may not be accessed by that particular processor is designated in FIGURE 2 as "off cycle." The foregoing arrangement permits one processor to be manipulating data while the other processor has access to memory 24.

DETAILED DESCRIPTION OF BIT PROCESSOR AND SHARED CONTROL MEMORY CIRCUITRY

Figure 3:
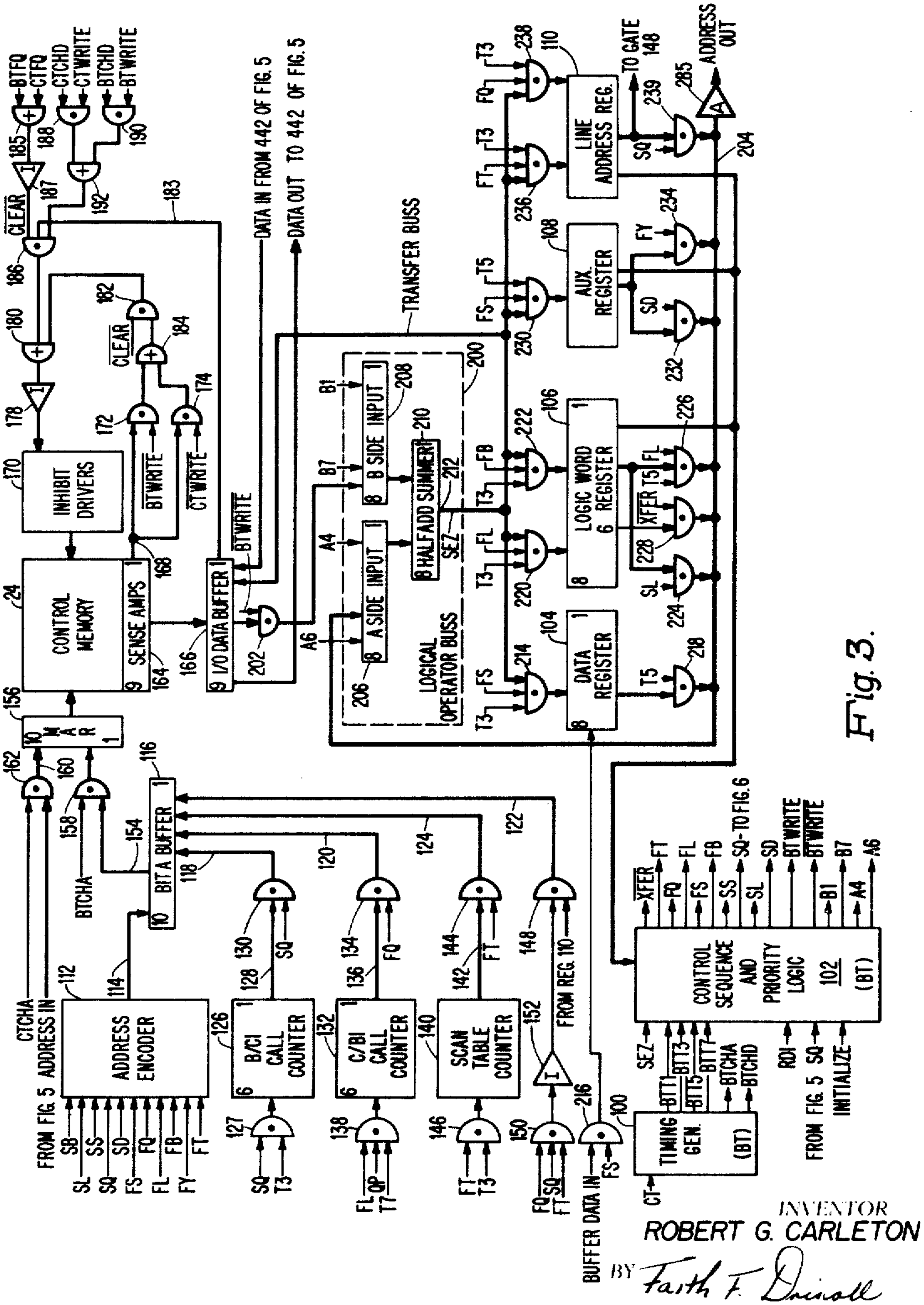
FIGURE 3 illustrates in further detail the logic of the bit processor of FIGURE 1.

With reference to FIGURE 3, there is shown in detail the logic constituting the bit processor 20 and detailed logic comprising the control memory 24. With reference to FIGURE 3, there is shown a signal CT supplied as an input to a timing generator 100. The timing generator 100 may comprise known circuitry which may take the form of a counter or sequence of one shot multivibrators which are adapted upon the occurrence of the signal CT to produce as outputs, the signals BTT1, BTT3, BTT5, BTT7, BTCHD and BTCHA. The relationships between each of these timing signals with respect to one another are as shown in FIGURE 2. The aforementioned timing signals are applied as inputs to control sequence logic 102 which is adapted to receive as further inputs the signals RDI and SQ from the bit buffers 16 and character processor 22 respectively. The control logic 102 is connected to receive as further inputs, the signals SEZ in addition to and output signals from *an*logic word register 106 *an,* auxiliary register 108*an,* and line address register 110.

The control sequence and priority logic 102 is operative to produce as outputs, the signals $\overline{\text{XFER}}$, subcommand signals FT, FQ, FL, FS, FB, SS, SQ, SL and SD. The subcommand signals prefaced with the letter "F" denote a fetch data operation while the subcommand signals prefaced with the letter "S" denote a store data operation. Further outputs produced in the control sequence and priority logic 102 include write control signals BT WRITE, $\overline{\text{BT}}$ $\overline{\text{WRITE}}$ and a plurality of bus control signals appearing on the lines A4, A6, B1 and B7. A further output from the control sequence and priority logic 102 is a signal SQ which is applied as an input to the character processor 22 logic of FIGURE 6 (i.e. bit to character interrupt flip-flop 544). The subcommand signals SB, SQ, SL, SD, SS, FQ, FL, FB, FY and FG appear as inputs to address decoder 112 which is operative to produce a unique group of coded output signals for each subcommand on line 114. The latter line 114 is connected as an input to a bit address buffer 116. The manner of generating the aforementioned decoded-encoded signals is well known in the art and the text entitled "Arithmetic Operations in Digital Computers" by R. K. Richards may be consulted with respect to details regarding the implementation of such encoder.

Although a single output line 114 is shown as an output from address encoder 112, it will be appreciated that this line represents four such lines for effecting the transfer of a four bit code into the high order end of the bit address buffer 116. In FIGURE 3, all such multiple conductor lines are represented by heavily drawn signal lines. Similarly, heavily drawn gates represent a plurality of gates connected in parallel. The ligthly drawn lines represent individual lines and gates for handling individual bits and control signals.

The bit address buffer 116 has as further inputs, the control signals appearing on each of the lines 118, 120, 122, and 124. Although each of the aforementioned lines are shown as a single conductor, each line actually consists of six conductors connected to the low order six bit positions of bit address buffer 116. The signals appearing on line 118 are applied from the bit/character interrupt call counter 126 on line 128 by way of AND gate 130 which has a further input, the signal SQ from control sequence and priority logic 102. The counter 126 is a six bit counter which may comprise a plurality of flip-flop stages connected in a well known manner so as to form such counter. The counter 126 is adapted to be incremented by the signal SQ applied as an input thereto from control sequence and priority logic 102 by way of an AND gate 27 which is connected to receive as a further input, the timing signal T3 from the timing generator 100.

Similarly, signals appearing on line 120 are applied from the output of character/bit interrupt call counter 132 by way of an AND gate 134 connected to receive the latter signals on output conductor 136 an addition to the signal FQ from the control sequence or priority logic 102. The Counter 132 has as an incrementing input the signal appearing at the output of an AND gate 138 which has as inputs the signals FL and QP from control sequence and priority logic 102 in addition to the timing signal T–7 from the timing generator 100.

The signals appearing on line 124 are applied thereto from the counter 140 by way of output conductor 142 connected as an input to an AND gate 144 which is connected to as a receive as a further input, the signal FT from control sequence and priority logic 102. The counter 140 has incrementing input applied at the output of an AND gate 146 which has as further inputs the signals FT from control sequence and priority logic 102 and T3 from timing generator 100.

The signals appearing on line 122 are applied from the low order six bit positions of the line address register 110 by way of an AND gate 148 which is connected to receive as a further input the signals FQ, FL and FT from control sequence and priority logic 102 applied thereto by way of AND gate 150 and inverter 152.

It will be appreciated that the aforementioned AND gates and conductors are multiple-conductor lines for conveying several bits of information in parallel while the latter gates represent a plurality of gates connected in parallel each of which when activated are operative to transfer the contents of each of the counters 126, 132, 140 and line address register 110 associated therewith.

The output signal from the bit address buffer 116 appearing on line 154 is applied as inputs to memory address register 156 by way of an AND gate 158 having as a further input the signal timing generator 100. The memory address register 156 is also connected to receive the signals appearing on line 160 by way of AND gate 162 which has inputs the signals, ADDRESS IN and CTCHA from the character processor 22. The contents of memory address register 156 specifies the address of the location within control memory 24 being referenced and more particularly the first five high order bit positions of the register contents specify the particular section within control memory being referenced while the remaining bit positions specify the address within the particular section being referenced. Upon the decoding of the particular address contained within the register 156, the contents of the memory location referenced appear at the output of a plurality of sense amplifiers 164 and are transferred to an I/O data buffer 166. During a read-restore cycle, the outputs of the sense amplifiers 164 appearing on line 168 are written back into the same memory location by proper activation of inhibit drivers 170; the latter being effected either the activation of either an AND gate 172 or an AND gate 174. The latter gates are connected to receive in addition to these sense amplifier inputs, the signals $\overline{\text{B}}$ $\overline{\text{T WRITE}}$ and $\overline{\text{CT}}$ $\overline{\text{WRITE}}$ respectively. The outputs of the AND gates 172 and 174 are connected as inputs to inhibit the drivers 170 by way of a path including an inverter 178, or gate 180, and gate 182 and or gate 184. The gate 182 is connected to receive as a further input the signal $\overline{\text{CLEAR}}$.

During a read-write cycle, the contents of the address location referenced appear at the outputs of the sense amplifiers 164 and are transferred to I/O data buffer 166 but are not directly re-written back into the address memory location. Instead, the contents of the register 166 appearing on a line 183 are written into the addressed memory location by proper activation of inhibit drivers 170 by way of inverter 178, OR gate 180 and AND gate 186. The AND gate 186 is connected to receive as further inputs to the signal $\overline{\text{CLEAR}}$ and from an OR gate 192 the signals CTCHD, CT WRITE and BTCHD, BT WRITE applied by way of AND gates 188 and 190 respectively. The signal $\overline{\text{CLEAR}}$ is applied as an input to the AND gate 186 by way of the inverter 187 which receives as inputs, the signals BCFQ and CCFQ from an OR gate 185.

Both of the memory registers 156 and 166 may comprise conventional flip-flop multi-bit registers of the type described in the aforementioned patent to Henry Schrimpf. The data buffer register 166 is connected to receive a DATA IN input and an input from a transfer bus in addition to being connected to generate a DATA OUT output and an output to one side of a logical operator bus 200 by way of an AND gate 202 which is connected to receive as a further input, the signal BT $\overline{\text{WRITE}}$. The logical operator bus 200 has as further, the inputs outputs from each of the registers 104, 106, 108 and 110 appearing on the line 204. The logical operator bus 200 is shown as comprising an A side input 206 and a B side 208, the outputs of which are connected to a half add summer 210. The output of the half add summer 210 is connected to the transfer bus. Each of the A side inputs may comprise a plurality of gates, each connected in parallel for receiving output signals from each of the registers 104, 106, 108 and 110. The half add summer 210 may also be seen to comprise a plurality of gates connected to compare corresponding output bit positions of the A side input 206 and B side input 208. The output signals generated as a result of this comparison appear on line 212 which is connected to the transfer bus. It will be appreciated that although the line 212 is indicated as a single conductor, it actually consists of 8 individual conductors connected to the transfer bus. The A side input 206 is adapted to receive the signals on the lines A6 and A4 connected to the corresponding bit position gates by way of the control sequence and priority logic 102. The B side input 208 is connected to receive signals on lines B7 and B1 from control sequence and priority logic 102 connected to the appropriate gates of the corresponding bit positions. The logical operator bus 200 is operative to perform, by means of a simple comparison logical operations, those for effecting the manipulation of the bit configurations applied thereto and includes means for masking out the contents of certain bit positions, as well as adding in bits to certain bit positions. In terms of cost and speed, this bus arrangement has been found preferable to an arithmetic unit to perform the aforementioned operations. Further, this bus arrangement also provides an efficient means of effecting the transfer of the contents of different registers to other registers within the processor. The manner of implementing the latter will be quite apparent to those skilled in the art and for that reason has not been disclosed in detail herein.

The transfer bus is connected as an input to each of the registers 104, 106, 108 and 110. The register 104 is adapted to receive the signals appearing on the transfer bus by a way of gate 214 having as further inputs, the signals T3 from timing generator 100 a signal and FS from the control sequence and priority logic 102. The data register 104 receives as a further input an output from an AND gate 216 connected to the high order bit position of such register. The AND gate 216 has as inputs, the signals, BUFFER DATA IN from bit buffers 16 and the signal FS from the control sequence and priority logic 102. The data register 104 is connected to the line 204 by way of an AND gate 218 connected to receive as a further input, the timing signal T5 from the timing generator 100.

In a similar fashion, the logic word register 106 is connected to the transfer bus by way of either an AND gate 220 or an AND gate 222, the AND gate 220 has as further the signal T3 from timing generator 100 and the signal FL from control sequence and priority logic 102. The AND gate 222 connected to receive as further inputs, the signal T3 from timing generator 100 and subcommand signal FB from control sequence from priority logic 102. The output of the logic word register 106 is connected to line 204 by way either of an AND gate 224 having as a further input the subcommand signal SL from control sequence and priority logic 102 or the further AND gate 226 having as inputs, the signal T5 from timing generator 100 and the subcommand signal SL from control sequence and priority logic 102. The sixth bit position of the register 106 is connected to the line 204 by way of an AND gate 228 having as a further input the $\overline{\text{XFER}}$ signal from the control sequence and priority logic 102.

The transfer bus is connected to an auxiliary register 108 by way of an AND gate 230 connected to receive as further inputs, the timing signal T5 from timing generator 100 and the subcommand signal FS from control sequence and priority logic 102. The auxiliary register 108 is connected to line 204 either by way of an AND gate 232 having as a further input the subcommand signal SD from control sequence and priority logic 102 or an AND gate 234 having as a further input a subcommand signal FY from control sequence a priority logic 102.

The line address register 110 is connected to the transfer bus my way of either an AND gate 236 having as inputs the timing signal T3 from timing generator 100 and subcommand signal FT from the control sequence and priority logic 102 or by way of an AND gate 238 having as an input signal T3 from timing generator 100 and subcommand timing signal FQ from control sequence and priority logic 102. The output of the line address register 110 is connected to the line 204 and through amplifiers 285 to the lines ADDRESS OUT.

DESCRIPTION OF CONTROL SEQUENCER AND PRIORITY LOGIC 102

Figure 4:
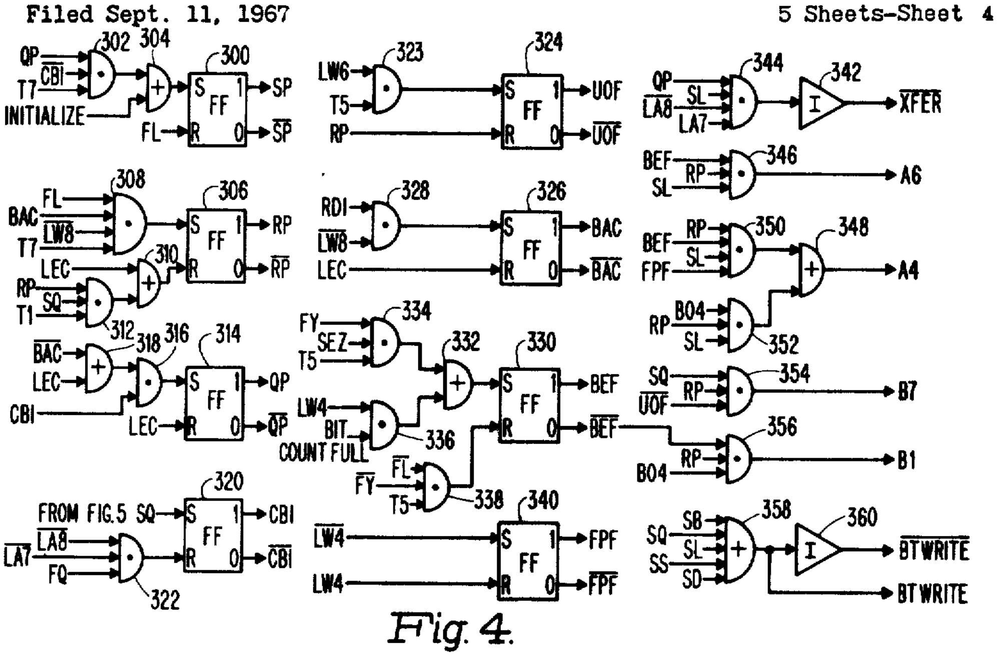
FIGURE 4 illustrates in further detail a portion of the logic of the sequence and priority logic of FIGURE 3.

With reference to FIGURE 4 there is shown the control logic for generating control signals utilized for generating the required subcommand signals, control bus signals and other outputs, appearing as outputs from the control sequencing and priority logic 102. Now referring to the FIGURE 4, there is shown a scan control flip-flop 300 having as inputs to its set side the signals QP, $\overline{\text{CBI}}$ and timing signal T7 applied by way of an AND gate 302 and an OR gate 304 having as a further input the signal INITIALIZE. The control flip-flop 300 is adapted to receive as a reset input, the signal FL. A receive path control flip-flop 306 is connected to receive as set inputs, the signals FL, BAC, $\overline{\text{LW8}}$ and timing signal T7 by way of an AND gate 308. The latter flip-flop has as its reset inputs the signal LEC applied as an input to OR gate 310 having as further input the output of AND gate 312 which has as inputs, the signal RP, SQ, and timing signal T1.

A queue path control flip-flop 314 which has connected, thereto as a set input, the signal CBI connected by way of an AND gate 316 having as a further input the output of an OR gate 318 which is connected to receive as inputs the signals $\overline{\text{BAC}}$ and LEC. A character to bit interrupt control flip-flop 320 has as a set input, the signal SQ and is connected to be reset upon the application of signals $\overline{\text{LA8}}$, $\overline{\text{LA7}}$ and FQ applied to the reset side thereof by way of an AND gate 322.

The control flip-flop 324 is connected to be set to produce as an output the signal UOF upon the application thereto of the signals LW6 and T5 by way of an AND gate 323. The latter flip-flop 328 is operative when reset upon the application of the signal RP to produce as an output, the signal $\overline{\text{UFO}}$. The control flip-flop 326 is operative when set to produce as an output the signal BAC upon the application of the signals $\overline{\text{RDI}}$ and $\overline{\text{LW8}}$ by way of AND gate 328 to its set side. The latter flip-flop when reset by the signal LEC applied to its reset side produces 326 and output the signal $\overline{\text{BAC}}$.

A buffer equals full control flip-flop 330 is operative when set to produce as an output, the signal BEF upon the application to the set side thereof the signals FY, SEC and timing signal T5 by way of an OR gate 332 and an AND gate 334. Additionally, the signals LW4 and bit count full when applied to the OR gate 332 by way of AND gate 336 are also effective to set flip-flop 330. The resetting of flip-flop 330 is effected upon the activation of an AND gate 338 upon application thereto of signals $\overline{\text{FL}}$, $\overline{\text{FY}}$ and T5. The control flip-flop 340 is operative when set to produce as an output, the signal FPF the application of the signal $\overline{\text{LW4}}$ to its set side. The latter flip-flop upon when reset by the application of the signal LW4 to its reset side produces as an output the signal $\overline{\text{FPF}}$.

The signal $\overline{\text{XFER}}$ is generated as an output from an inverter 342 upon the activation of an AND gate 344 having as inputs the signals QP, SL, $\overline{\text{LA8}}$ not and LA7.

A signal appearing on line A6 is produced as an output from an AND gate 346 which is connected to receive as inputs, the signals BEF, RP and SL.

An output signal is produced on line A4 upon the activation of an OR gate 248 which is connected to receive as inputs the signals RP, BEF, SL, and FPF by way of AND gate 350. OR gate 348 is connected to additionally receive the signals BO4, RP and SL by way of a second AND gate 352. AND gate 354 is operative when activated to produce an output on line B7 upon the application of the signals SQ, RP and $\overline{\text{UOF}}$.

AND gate 356 is operative when activated to produce an output signal on line B1 upon the application of the signals $\overline{\text{BEF}}$ from control flip-flop 330, RP and BO4. The signals SB, SQ, SL, SD and SS applied as inputs to OR gate 358 which is operative when activated to generate as an output the signal BT WRITE. The output of the DR gate 358 connected as an input to inverter 360 has as an output, the signal $\overline{\text{BT WRITE}}$.

DETAIL DESCRIPTION OF THE CHARACTER PROCESSOR LOGIC

Figure 5:
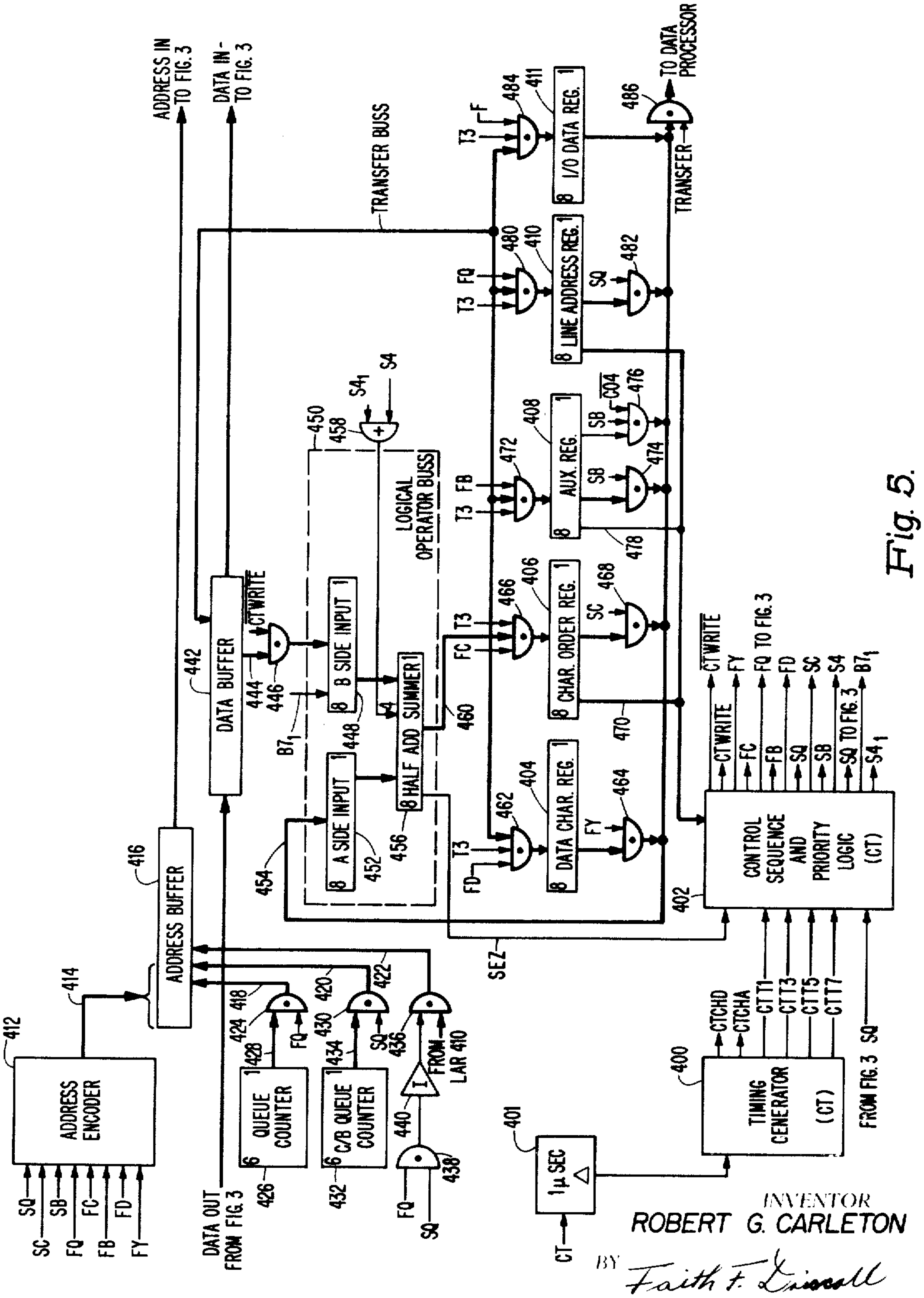
FIGURE 5 illustrates in further detail the logic of the character processor of FIGURE 1.

With reference to FIGURE 5, the character processor logic will be described. It will be apparent that there are many similarities between the logical organization of the bit processor of FIGURE 3 and the character processor logic of FIGURE 5. Therefore, the description relative to the latter will be attempted to be made as brief as possible in order to avoid undue duplication.

Now referring to FIGURE 5, there is shown a timing generator 400 adapted to receive as an input, the signal CT by way of a one microsecond delay. Upon each occurrence of the delayed timing signal CT, the timing generator 400 is operative to produce as outputs the signals CTT1, CTT3, CTT5, CTT7, T7, CTCHD and CTCHA. The latter signals appear as inputs to a control sequencer and priority logic 402 which is adapted to receive as a further input a signal SQ from the bit processor 20. The control sequence and priority logic 402 is operative to produce as outputs subcommand signals FY, FC, FB, FD, FQ, SQ, SC, SB and bus control signals S4 and S41. The latter is also operative to produce as outputs the signals, $\overline{\text{CT WRITE}}$, CT WRITE and a character signal SQ to the to bit interrupt flip-flop 320 of FIGURE 4.

The aforementioned subcommand signals SQ, SC, SB, FQ, FC, FB, FD, and FY are applied as inputs to an address encoder 412 adapted to generate a unique code on line 414 which is connected as an input to address buffer 416. The address buffer 416 has as a further input from line 418 the output of AND gate 424 connected to receive the 6 bit output of Queue counter 426 on lines 428; the counter 426 has as a further input the subcommand signal FQ from control sequence and priority logic 402. The output of AND gate 430 is applied as an input to address buffer 416 on line 420; latter AND gate having as one input the 6 bit output of a character to bit queue counter transferred on line 434 and as a further input the subcommand timing signal SQ from control sequence and priority logic 402. A third input applied to address buffer 416 is the output 422 of AND gate 436 which is connected to receive as inputs the output of line address register 410 and the signals FQ and SQ applied by way of an AND gate 438 ond inverter 440. The address buffer 416 has as an output a line ADDRESS IN.

A data buffer 422 is connected to receive as inputs, a DATA OUT line from bit processor 20 of FIGURE 3 and an input from the transfer bus an output is adapted to provide as an output a DATA IN line to the bit processor 20.

Data buffer 422 provides additional output on line 444 to AND gate 446 which has as a further input the signal $\overline{\text{CT WRITE}}$ from control sequence and priority logic 402. The output of AND gate 446 is supplied as an input to the B side input 448 of the logical operator bus 450 and has as a further input, the line B7, from control sequence and priority logic 402. The A side input 452 of the logical operator bus 450 has as an input a line 454. The outputs of the B side input 448 and A side input 452 are connected as inputs to half add summer 456 which has as further inputs the lines S4 and S4, from control sequence and priority logic 402 applied by way of OR gate 458. Half add summer 456 when activated is operative to produce as an output, the signal SEZ which connected as an input to control sequence and priority 402 by way of the line 460. The line 460 is also connected to the transfer bus which appears as an input to each of the registers 404, 406, 408, 410 and 411. The transfer bus is connected to the data character register 404 by way of AND gate 462 having as further inputs timing signal T3 from timing generator 400 and subcommand timing signal FD from control sequence and priority logic 402. The output of the register 404 is connected to line 454 by way of AND gate 464 which has as a further input the subcommand signal FY from control sequence and priority logic 402.

The character order register 406 is connected to the transfer bus by way of AND gate 466 which has as further inputs timing signal T3 from timing generator 400 and subcommand timing signal FC from control sequence and priority logic 402. The output of the character order register 406 is connected to line 454 by way of AND gate 468 which has as a further input a subcommand signal SC from control sequence and priority logic 402. An output of the character order register 406 is connected as an input to control sequence and priority logic 402 by way of line 470 (i.e., bit positions 4 and 8).

An auxiliary register 408 is connected to the transfer bus by way of AND gate 472 which has as a further input the signal T3 from timing generator 400 and subcommand signal FB from control sequence and priority logic 402. The output of the auxiliary register 408 is connected to line 454 by way of AND gate 474 having as a further input the subcommand signal SB from control sequence and priority logic 402. The fourth bit position of the auxiliary register 408 is connected to line 454 by way of AND gate 476 having as a further input the signal $\overline{\text{C04}}$ not from character order register 406 and a subcommand signal SB from control sequence and priority logic 402. Additionally, the auxiliary register 408 provides an input on line 478 (i.e., bit positions 7 and 8) to control sequence and priority logic 402.

The line address register 410 is connected to the transfer bus by way of AND gate 480 having as further inputs the signals T3 from timing generator 400 and subcommand signal FQ from control sequence and priority logic 402. The line address register 410 is connected to line 454 by way of AND gate 482 having as a further input the subcommand signal SQ from control sequence and priority logic 402.

An input-output data register 411 for communicating between the multiplexor and the data processor 10 is connected to the transfer bus by way of AND gate 484 having as further inputs timing signal T3 from timing generator 400 and the signal F. The data register 411 is connected to the data processor input bus, not shown, by way of AND gate 486 having as an further input the signal TRANSFER.

Each of the above-mentioned registers may comprise a plurality of flip-flops connected in a well known manner.

In the logical arrangement illustrated in FIGURE 5, all the heavily drawn signal lines are multiple-conductor lines for conveying several bits of information in parallel. Similarly, the heavily-drawn gates represent a plurality of gates connected in parallel. The lightly-drawn lines each represent individual lines and gates for handling individual bits or control signals. All of the components illustrated are well-known and commonly-used in computer elements.

DETAIL DESCRIPTION OF THE CONTROL SEQUENCE AND PRIORITY LOGIC 402 OF FIGURE 6

Figure 6:
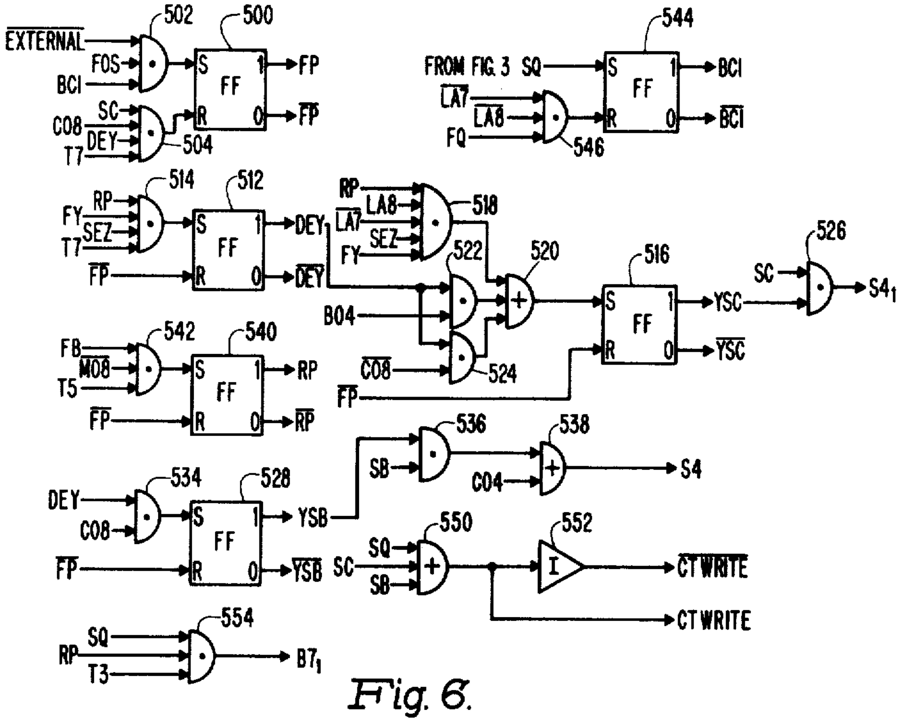
FIGURE 6 illustrates in further detail the portion of the sequence and priority logic of FIGURE 6.

Now referring to FIGURE 6, there is shown a first finder path control flip-flop 500 operative when set to produce as an output, signal FP upon the application of the signals $\overline{\text{EXTERNAL}}$, FOS and BCI applied to the set side thereof by way of AND gate 502. The signal EXTERNAL may be generated by any well known means for indicating there is EXTERNAL activity to be performed by a multiplexor while the signal FOS is indicative of the fact that the multiplexor has an order stored which permits communication between the multiplexor 14 and the data processor 10 by way of an assigned read-write channel. The control flip-flop 500 is operative when reset to produce as an output, the signal $\overline{\text{FP}}$, the latter being effected upon the application of the signals SC, C08 from character order register 406, DEY and T7 applied by way of AND gate 504.

A control flip-flop 512 is operative when set upon the application of the signals RP, FY, SEZ and T7 by way of AND gate 514 to produce as an output, the signal DEY. The latter flip-flop 512 is operative when reset upon the application of the signal $\overline{\text{FP}}$ to produce as an output signal $\overline{\text{DEY}}$. The output signal DEY from flip-flop 512 is applied as an input to control flip-flop 516 which is operative when set to produce as an output, the signal YSC; the latter being effected upon the application of either the signals RP, LA8, $\overline{\text{LA7}}$ (from line address register 14), SEZ and FY applied by way of AND gate 518 and OR gate 520 or by the signals DEY and B04 from auxiliary register 408 applied to control flip-flop 516 by way of AND gate 522 and OR gate 520. Additionall, the signals DEY and $\overline{\text{C08}}$ effect the setting of control flip-flop 516 when applied to the set side thereof by way of AND gate 524 and OR gate 520. Resetting of control flip-flop 516 is effected upon the application of the signal $\overline{\text{FP}}$ to the reset side thereof. The set side of control flip-flop 516 is connected as an input to AND gate 526 having as a further input, the signal SC. The output of the AND gate is connected to line S4.

A control flip-flop 528 is connected to receive as inputs, the signals DEY, CO8 applied by way of AND gate 534. Flip-flop 528 is operative when set to produce as an output the signal YSB and is operative to be reset upon the application of signal $\overline{\text{FP}}$ applied to its reset side. The one side of control flip-flop 528 is connected as an input to AND gate 536 having as a further input, the signal SB. The latter gate has its output connected to an OR gate 538 having as a further input, the signal CO4 from control order register 406. The output of AND gate 538 is connected to line S4.

A further control flip-flop 540 is connected to receive as reset inputs, the signals FB, $\overline{\text{MO8}}$ from auxiliary register 408 and T5 by way of AND gate 542. The latter flip-flop is operative when set to produce as an output, the signal RP and is connected to be reset upon the application of the signal $\overline{\text{FP}}$ applied to its reset side.

A bit to character interrupt flip-flop 544 is adapted to be set upon the application of the signal SQ from the bit processor 20, thereby producing as an output the signal BCI. The flip-flop 544 is adapted to be reset upon the application of the signals $\overline{\text{LA7}}$, $\overline{\text{LA8}}$ and $\overline{\text{FQ}}$ applied by way of AND gate 546.

An OR gate 550 is connected to receive as inputs the signals SQ, SC and SB and is operative when activated to produce as an output the signal CT $\overline{\text{WRITE}}$. The signal $\overline{\text{CT}}$ $\overline{\text{WRITE}}$ is produced as an output of inverter 552 which has as an input the signal CT WRITE from OR gate 550. An AND gate 554 is adapted to receive as inputs the signals SQ, RP and T3 and has its output connected to line B7.

SYSTEM OPERATION

With reference to FIGURES 1, 2, 3, 4, 5 and 6, the operation of the subject system will now be described. The operation will be described in relation to the operation of a synchronous line wherein the multiplexor 14 of FIGURE 1 is required to recognize having received from such line two successively occurring synchronization characters before initiating the transfer of assembled data characters. It can be further assumed that the particular line under consideration will have been previously conditioned for receiving. The latter may be effected either by having the program loaded control information for that line denote that such line is in a receive mode of operation or by having the data processor 10 initiate an instruction to the multiplexor 14 whereby that particular line is conditioned for receiving.

Normally, the bit processor 20 is seen to alternately effect either a scanning operation wherein a line address is read out of the scan table portion of control memory 24 and interrogated for activity or the processing of an entry in the character to bit queue table Section 12 of control memory 24 of FIGURE 1A. Thus, the bit processor 20 is seen to divide its time between these two operations. At this outset, an external control signal initialize is applied to the control and priority logic 102 of FIGURE 3 to set flip-flop 300 of FIGURE 4 which is operative to produce as an output, the signal SP. This signal conditions the bit processor 22 to effect a scanning operation whereby the processor is operative to read a line number out of the scan table and interrogate a particular line number for activity. The processor requires two memory cycles to perform this operation: the first cycle (FT cycle) during which the scan table is addressed using contents effected by the scan table counter and the second cycle (FL cycle) which is used to access a control word (logic word) for the particular line number specified which had been previously read out of the scan table; the latter access being on conditioned the fact that there is activity on the particular line. During this second cycle there may be a modification of the logic word and several control flip-flops may be either set or reset depending on the state of certain bit positions in the logic word.

The scan cycle subcommand signal FT is generated when the following Boolean statement is met: QP.$\overline{\text{CBI}}$ +—where (+) denotes an OR function and (·) denotes an AND operation. When either of these conditions are met, the subcommand signal FT is generated by the control sequence and priority logic 102 of bit processor 20 and endures for a complete cycle; that is from time T1 of a first cycle to the beginning of time T1 of a second cycle.

The means by which the subcommand signal FT is generated, as well as other subcommand signals to be discussed below are not shown since such means will be apparent to those skilled in the art. For example, AND gating structure may be used to combine the various signals such as when the specified signal conditions are met, a storage device in the form of a flip-flop is set thereby and is both operative at that time to generate the particular subcommand signal and connected to be reset at the end of a cycle time. The latter subcommand signal may also be generated by having the output of such AND logic when activated trigger a one-shot multivibrator whose time duration corresponds to a cycle time.

During the aforementioned FT cycle, the contents of the scan table counter 140 of FIGURE 2 is gated into bit address buffer 116; the latter transfer being effected by the activation of AND gate 144 by the subcommand signal FT. Simultaneously therewith, the application of subcommand signal FT to the address decoder 112 effects the generation of a unique two-bit code (00) which is transferred into the high order two bit positions of bit address buffer 116. Upon the generation of timing signal BTCHA by timing generator 100, the 10 bit contents of address buffer 116 applied to line 154 are transferred by way of gate 158 to memory address register 156 of control memory 24.

The contents of the scan table counter 140 together with the two high order bit positions defined by subcommand signal FT cause the addressing of a particular location within the scan table section of control memory 24. The 8 bits of the addressed storage location of the scan table appearing at the outputs of sense amplifiers 164 are automatically transferred to data buffer 166. Simultaneously therewith, the signals appearing at the outputs of sense amplifiers 164 are restored into the addressed memory location by proper activation of the inhibit drivers 170. The latter is effected by the activation of AND gate 172 and gates 184, 182, 180 and 178.

It is assumed that the bit processor 20 has access to control memory 24 during this cycle and since the cycle is used for a fetch operation in contrast to a store operation, the store subcommand signals are not generated during this cycle. Therefore the signal $\overline{BT}\ \overline{WRITE}$ is generated as an output at inverter 360 of FIGURE 4. Consequently, at time T3 the contents of the data buffer 166 are gated by way of AND gate 204 to the B side input of the logical operator bus 200. The contents are transferred to line address register 110 by way of AND gate 236. The line address contents of the register 110 include control bits indicating the line type (bits 7 and 8) and a line address defined by the low order 6 bit positions of that register. These latter 6 bits are transferred to the ADDRESS out lines by way of amplifiers 285 and appear as inputs to each of the bit buffers 16. The address bits are decoded by all of the bit buffers 16 and the particular bit buffer 16 having the corresponding address fixed wired therein is connected to generate a either request demand input signal RDI when transferring data to the multiplexor which appears as an input to the control sequence and priority logic 102 or a request demand output signal RDO when transmitting data to its associated line.

At the end of timing signal T3, the scan table counter 140 is incremented by one, by the activation of gate 146 when conditioned jointly by the signals FT and T3.

The next cycle coccurring within the scanning operation is a FL cycle which is generated when the following Boolean statement is met: $SP.FP.T7+QP.\overline{LA8}.LA7.T7$. Disregarding at this time, the latter portion of the expression, the subcommand signal FL is generated when the signals SP and FP are both present at time T7, the signal SP generated by the previous setting of control flip-flop 300 of FIGURE 4 and the signal FT, the prior subcommand signal, endures until the beginning of the next cycle time T1. During this cycle, the line number that was read out in the last cycle and stored in the line address register 110 is used to address the line oriented logic word section of control memory 24 for accessing the logic word for the particular line number previously read out of the scan table. The latter is effected by the transfer of the 6 bit contents of register 110 to the bit address buffer 116 by way of AND gate 148 conditioned by output signal at the inverter 152 to the absence of one of the input signals FQ, FT or SQ being applied thereto.

Simultaneously with the register transfer, a four bit address specifying the logic word section of memory is transferred to high order bit positions of address buffer 116, the latter effected by the application of subcommand signal FL to address encoder 112. The logic word for the particular line, specified by the contents of the line address register, is read out of control memory 24 and transferred to the B side of the operator bus 200 by way of data buffer 166 and AND gate 202. The latter gate is activated by the signal BT $\overline{WRITE}$ generated as an output from logic 102 at the beginning of time T1 of the cycle. Since no input signals are applied to the A side input 206 of the operator bus 200, the signals corresponding to the contents of the address storage location appear on line 212, at the output of half add summers 210 and are transfered onto the transfer bus to the logic word register 106 by way of gate 220 conditioned by the signals T3 and FL.

With reference to FIGURE 2, it is seen that the termination of timing signal T3 or the beginning of timing signal T5 defines the "off cycle" portion of the bit processor cycle wherein memory 24 cannot be accessed by the bit processor 20. During this second half of the cycle, data manipulation is effected.

There are three control flip-flops in FIGURE 4 that are connected to be responsive to the bit configuration of a particular logic word stored in logic word register 106. These are: control flip-flop 340, buffers equals full control flip-flop 330 and control flip-flop 324. It may be assumed that these flip-flops are unconditionally reset subsequent to the termination of timing pulse T5 by means not shown.

The control flip-flop 340 is normally set to its one state by the signal $\overline{LW4}$ since bit position 4 of logic word 4 contained within the register 106 is normally in a zero state. The reason for this will be explained in detail below. The control flip-flop 324 of FIGURE 4 in an initially reset state is connected to be responsive to the state of bit position 6 of logic word which may be referred to as a character call bit. This bit position is set to a binary one, when the bit processor 20 transfers an assembled character to the buffer storage section of control memory 24 previously received which has been from the particular line. Thus, control flip-flop 324 is set whenever the logic word transferred to logic word register 106 has a binary one stored in bit position 6.

At time T5, the logic word contained within registor 106 is transferred to the A side input 206 of the operator bus 200 the latter transfer proceeds by way of AND gate 226 which is activated upon the application of a subcommand timing signal FL and timing signal T5, thereto. Normally, a binary one is applied to the B side input 208 of the operator bus 200 on line B1. This "one" is added to the bit count contained within the first three low order bit positions of the logic word, the latter assumes the activation of a carry in signal (not shown) being applied to the bus for effecting the incrementing of the bit count. The contents of auxiliary register 108 is normally operative to supply the signal BO4 on line 4 of register 108 to AND gate 356 of FIGURE 4. However, the AND gate 356 remains inactive and no output signal appears on line B1 at this time (i.e. register 108 is empty).

Assuming that a particular bit buffer previously addressable has a bit previously stored for transfer to bit processor 20 and has therefore upon the addressing thereof generated the appropriate RDI request input to the control sequence and priority logic 102, the control flip-flop 326 is set to its one state thereby producing as an output, the signal BAC. The latter setting of the flip-flop 326 is effected upon the activation of AND gate 328 when conditioned jointly by the request demand input signal RDI from bit buffer 16 and a signal LW8, generated as an output from the 8th bit position of logic word register 106. Prior to the termination of the second cycle the flip-flop 306 is set by the activation of AND gate 308 which is conditioned by the presence of input signals BAC, $\overline{LW8}$, timing signal T7 and subcommand signal FL. The second cycle is terminated at the end of timing signal T7.

The third cycle is a FS cycle during which time the subcommand signal FS is generated when the following Boolean statement is met: RP.FL.T7. During this cycle, the serial buffer for the particular line is addressed. The latter is effected by the activation of gate 148 which transfers the low order 6 bit positions of line address register 110 to bit address buffer 116. Simultaneously therewith a unique 4 bit code specifying the serial buffer section of control memory 24 is transferred to the high order 4 bit positions of the bit address buffer 116. The latter is effected by the application of a subcommand signal FS to address encoder 112. Upon the activation of AND gate 158 when conditioned by the signal BTCHA the serial buffer for the particular line is addressed and the contents of that storage location is read out to the B of side input 208 of the operator bus 200 by way of data buffer 166 and AND gate 202. In the same manner previously described, the signals applied to the B side input 208 are transferred to data register 104, the latter being effected by the activation of gate 214 when having been conditioned by the signals FS and T3.

During this cycle, a bit from the addressed bit buffer 16 is transferred to the high order end bit position of data register 104 upon the activation of AND gate 216 which is conditioned by subcommand signal FS. It is assumed that every time a bit is stored into the data register 104, the contents of the register is shifted one position to the right. The manner in which the latter shifting is effected is as follows. Upon the occurrence of timing pulse T5, the contents of data register 104 are transferred to the A side of input 206 of the operator bus 200 and through the transfer bus to auxiliary register 108 by way of AND gate 230 when activated by timing signal T5 and subcommand signal FS. Subsequent to the latter transfer, the same information is now contained within both data register 104 and auxiliary register 108 and the cycle is then terminated.

The next cycle is an FY cycle during which time the subcommand signal FY is generated as an output from control sequence and priority logic 102 when the following Boolean statement is met: RP.FS.LA8.FPF.T7. Since the line under consideration is a synchronous line, the contents of the high order bit position (bit position 8) of line address register 110 contains a binary one in accordance with word format of the scan table format contents of control memory 24 as shown in FIGURE 1A. During this cycle, the stored special control character for that line in Section 10 of the control memory 24 is accessed and read out to the B side input 208 of the operative bus 200. The latter referencing of the special character for the particular line is effected by the transfer of the contents of the line address register 110 by way of AND gate 148 to bit address buffer 116. Simultaneously therewith there occurs a transfer of an appropriate 4 bit code to the high order 4 bit positions of the bit address buffer 116. The latter code is derived from the application of subcommand signal FY to address encoder 112. The addressed special control character for that line stored in control memory in addition to being read to the B side input 208 of the operator bus 200 is restored to the same memory location in the manner previously described in which the drivers 170 are properly activated by way of AND gate 172.

The contents of auxiliary register 108 are transferred to the A side input 206 of the operator bus 200 and applied during the time T1–T7 as defined by timing generator 100; the latter transfer being effected upon the activation of AND gate 234. If the signals applied to the B side input 208 of the operator bus 200 exactly correspond bit for bit to the signals applied to the A side input 206 of the bus (assembled data character), the signal SEZ is applied as an input to control sequence and priority logic 102 on line 212. This signal together with subcommand signal FY sets or control of flip-flop 330 of FIGURE 4 upon the occurrence of timing signal T5 when applied to the set side thereof by way of AND gate 134 and OR gate 332. It is assumed for the purposes of explanation that the present contents of auxiliary register 108, corresponding to the character assembled in register 104 subsequent to the last bit transfer has a bit configuration identical to the special control character for the particular line. Thus, the signal SEZ is generated and sets control flip-flop 330 which is operative at that time to produce as output, the signal BEF. The latter signal indicates that the bit processor has recognized a first synchronization character. Once a synchronization character has been recognized, the next bit received from that line corresponds to the first bit of a next character. The bit processor is operative to take action to insure that the bit count of the line starts out correctly by preventing the bit count from being modified until the recognition of the first synchronization character by such processor has been effected.

If the data bit transferred from the addressed bit buffer 16 to data register 104 when combined with the previous bits in the serial buffer for that line stored therein does not compare with the special control character for that line, an SS cycle is entered during which time the subcommand timing signal SS is generated as an output from control sequence and priority logic for that line. This occurs when the following Boolean statement is met: RP.FY.$\overline{\text{BEF}}$.T7. During this cycle, the serial buffer for that line is addressed, the latter effected by the transfer of the 6 bit contents of the line address register 110 by way of AND gate 148 to address buffer 16. Simultaneously, therewith, there occurs a transfer of 4 bit code to the 4 high order bit positions of buffer 116, which specifies the referencing of the appropriate storage location within the Section 6 of control memory 24. The contents of auxiliary register 108 are transferred to the A side input 206 of the operator bus 200 by way of gating structure (not shown) and transferred on the transfer bus to data buffer 166. From there, the contents are written into the storage location of Section 6 for that line. The latter is effected by the proper activation of inhibit drivers 170 upon the activation of AND gate 186 upon being conditioned by the application of the signals BTCHD and BT WRITE applied by way of AND gate 190 and OR gate 192. The latter signal, BT WRITE appears as an output of OR gate 358 of FIGURE 4 which is activated by the application of the subcommand signal SS as applied thereto. The cycle is terminated.

During the next cycle, the subcommand timing signal SL is generated as an output to the control sequence and priority logic 102 and the logic word for the particular line is stored in memory 24.

As mentioned previously, since it has been assumed that a first synchronization character for the particular line has been recognized by the bit processor 20, processing is seen to pass to a FB cycle in contrast to SS cycle during which time the subcommand timing signal FB is generated as an output of control sequence and priority logic 102 when the following Boolean statement is met: $\overline{\text{FPF}}$.BEF.$\overline{\text{FY}}$.RP.T7. During this cycle, the character representing the bit order for the line is addressed and read out to the B side input 208 of the operator bus 200. The latter effected by the transfer of the low order 6 bits contents of the line address register 110 by way of AND gate 148 to bit address buffer 116. Simultaneously therewith there occurs the transfer of the coded 4 bit configuration to the high order bit positions of the register 116 defining Section 7 of control memory 24. The latter code is generated by the conditioning of address encoder 112 by the application of subcommand timing signal FB thereto. Upon the occurrence of timing signal T3, bit order word for that line is transferred to logic word register 106 by way of AND gate 222 activated when conditioned by the subcommand signal FB and timing signal T3. The cycle is then terminated.

During the next cycle the subcommand signal SL is generated as an output from control sequence and priority logic 102 when the following statement is met: FB.RP.T7+FL.QP.T7. Since subcommand timing signal FB is present and the control flip-flop 306 is still set operative to produce the signal RP, these signals together with timing signal T7 effect the generation of subcommand signal SL. During this cycle the character storage location in Section 5 storing the logic word for that line is addressed. The latter is effected by the transfer of the 6 bit line address stored in line address register 110 by way of AND gate 148 to bit buffer 116. Simultaneously therewith, occurs a transfer of the appropriate 4 bit code specifying Section 5. The latter code is generated upon the conditioning of address encoder 112 by the application of subcommand signal SL thereto. The contents of character storage location addressed are prevented from being transferred to the B side input 208 of the operator bus 200 by the non-activation of AND gate 202. The latter being due to the appearance of no signal at the output of inverter 360 of FIGURE 4 which has applied as an input, the signal BT WRITE during this portion of the cycle.

The contents of logic word register 106 containing the bit order word for that line are transferred to the A side input 206 of the operator bus 200 by way of AND gate 224 when conditioned by the application of subcommand signal SL. The bits 8, 7, 3, 2, and 1 of the bit order word appear unmodified (in their present form) at the output 212 of half add summer 210. During this time, signals appearing on lines A6, and A4 generated by control sequence and priority logic 102 force bits 6 and 4 of the bit order word respectively to a binary one, which signals appear in their modified form on line 212 of half add summer 210. The signal appearing on line A4 is generated by the application of signals RP, BEF, SL and FPF to AND gate 850 of FIGURE 4 which is operative to produce a signal on line A4 by way of OR gate 348. The setting of bit 4 to a "one" denotes the fact that the bit processor 20 has recognized a first synchronization character. Additionally, a signal appears on line A6 generated by the activation of AND gate 346 when conditioned by the signals BEF, RP and SL. The setting of bit 6 to a binary "one" indicates the fact that a complete character, in this case, a synchronization character has been assembled from a particular line. The bits appearing on the transfer bus are written into the logic word storage location for that line. This is effected by the proper activation of inhibit drivers 170. Thus, at the completion of this cycle, the new logic word will have been generated, for the most part, from information derived from the bit order word for that line and written into the storage location for that line. The utilization of the three bit code level information of the bit order word is forming the new logic word insures that the bit count of the line starts out properly.

During a next cycle, the subcommand timing signal SD is generated as an output from control sequence and priority logic 102 when the following Boolean statement is met: RP.SL.$\overline{\text{LEC}}$.$\overline{\text{UOF}}$.T7 where the function $\overline{\text{LEC}}$ is present when the requisite number of cycles for processing a data bit has not been effected. During this cycle, the parallel buffer for that line in Section 10 of FIGURE 1A is addressed, the latter being effected in part by the transfer of the 6 bit line address contents stored in line address register 110 to bit address buffer 116 by way of AND gate 128. Simultaneously therewith, there is a transfer of a four bit code to the buffer 116 specifying the referencing of parallel buffer section 10 of FIGURE 1A. The latter is generated upon a conditioning of address encoder 112 by the application of subcommand timing signal SD applied thereto. The information read out from that particular location of Section 10 during this write cycle is prevented from being transferred to the B side input 208 of operator bus 200 by the non-activation of gate 202. The latter is due to the absence of the signal $\overline{\text{BT WRITE}}$ applied thereto. The contents of auxiliary register 108 are transferred to the A side input 206 of the operator bus 200 by way of AND gate 232 activated by the subcommand signal SD applied thereto. The synchronization character corresponding to a first assembled character for that line appearing at the A side input 206 is transferred onto the transfer bus and is written upon the occurrence of timing pulse T3 into the addressed location which corresponds to the parallel buffer storage location for that particular line. The cycle is subsequently terminated and a new cycle is initiated.

The next cycle is a SQ cycle during which time the subcommand timing signal SQ is generated as an output from control sequence and priority logic 102 when the following Boolean expression is met: RP.SD.T7. During this cycle, the bit to charter queue table of Section 11 is addressed. Since this cycle is another store or write cycle, the contents read out are prevented from appearing as inputs to the B side input 208 of the operator bus 200 due to the inactivation of AND gate 202. The latter addressing of Section 11 is effected by the transfer of a 6 bit contents of B/C interrupt call counter 126 to the bit address buffer 116 upon the activation of AND gate 130 by the subcommand signal SQ. Simulatneously therewith, there is a transfer of a 4 bit code specifying the referencing of Section 11 of control memory 24 from address encoder 112 when the latter is conditioned by the subcommand timing signal SQ applied thereto.

During the SQ cycle, the low order 6 bits contained within line address register 110, denoting the particular line number, is transferred to the A side input 206 of the operator bus 200 by way of AND gate 239 which is activated by the subcommand timing signal SQ applied thereto. The high order two bits are forced to assume a particular bit configuration indicating the type of action to be taken by the character processor 22 upon the receipt thereof. Since the control flip-flop 324 of FIGURE 4 is initially in its reset state, the latter being effected by the application of the signal RP to the reset side thereof, the signal $\overline{\text{UOF}}$ appears as an input to AND gate 354. The signal $\overline{\text{UOF}}$ together with the signals SQ and RP, conditions the AND gate 354 which is then operative to produce a signal on line B7. This signal causes bit 7 to be forced to a binary "one" state thereby causing the signals appearing on line 212 to assume the configuration 01 + line address. This bit configuration is written into the addressed storage location of Section 11 of control memory 24 upon the occurrence of timing signal T3. The call counter 126 B/C is incremented by one by the joint application of signal SQ and timing signal T3 to AND gate 27. The character bit interrupt flip-flop 544 of FIGURE 6 will have been set to its one state by the application to its set side of the subcommand timing signal SQ generated by the bit processor 20.

Since the bit processor 20 has effected all operations necessary to the storing of an assembled character from a particular line in the parallel buffer section of control memory 24, its tasks with respect to that character are now completed. It is the character processor's task to perform any necessary manipulation of the character and effect its transfer into the memory of the data processor 10. Since the character processor 22 has to perform numerous tasks with respect to its character processing such as for example, sequencing of orders for a particular line, status reporting to the data processor, operations relative to effecting the transfer of a data character to and from a data processor 10 are some of the tasks to be performed. Thus, in order for the character processor to effect the transfer of the data character which has been assembled by the bit processor 20 for that line, the character processor 20 must be signaled as to when the bit processor has completed the assembling of the character. The latter is effected by the aforementioned setting of the bit to character interrupt control flip-flop 544. The character processor, upon the sampling of this flip-flop, is operative to reference the *B/C* queue table Section 12 of FIGURE 1A of control memory 24.

It may be assumed that for the sake of simplicity that the character processor has no particular tasks to be performed at this time and is checking associated activity flip-flops (not shown) in order to respond to a first indication of activity. Since the bit to character interrupt flip-flop has been set by the bit processor 20, the subcommand timing signal FQ appears as an output from control sequence and priority logic 402 when the following Boolean statement has been met: FP.

The latter signal FP is generated by control flip-flop 500 of FIGURE 6 being set to its one state by the activation of AND gate 502 upon the application of the signals $\overline{\text{EXTERNAL}}$, FOS and BCI. The latter $\overline{\text{EXTERNAL}}$ signal indicating no external activity may be generated by means, not shown. The signal FOS is assumed to have been generated by the data processor 10 upon the assigning to the multiplexor 14 a read-write channel, in the manner previously mentioned. During the FQ cycle the *B/C* queue table is addressed and the entry for that line is read out. The referencing of the latter table is effected in part by the transfer of the contents of the queue counter 426 on line 428 to address buffer 416 by way of AND gate 424. The latter gate is conditioned to effect such transfer by the application of subcommand timing signal FQ thereto. Simultaneously therewith there is a transfer on line 414 of an appropriate 4 bit code generated by address encoder 412 upon the application of subcommand timing signal FQ applied thereto. The entire contents of address buffer 416 appearing on line 160 are transferred to the memory address register 156 of control memory 24 of FIGURE 3 upon the activation of AND gate 162 by the signal CTCHA. The latter signal is generated by timing generator 400 of FIGURE 5. The contents of the addressed character storage location of Section 11 are read out from control memory 24 to data buffer 442 of FIGURE 5 by way of data buffer 166 and appear as inputs to the B side input 448 of logical operator bus 450.

The latter transfer to the B side input 448 is effected by the activation of AND gate 446 by the signal $\overline{\text{CT WRITE}}$. The latter signal is produced as an output of inverter 552 of FIGURE 6 due to the non-activation of OR gate 550 as a consequence of the absence of signals SQ, SC, and SB applied as inputs thereto. The addressed character storage location of the queue table section 11 of control memory 24 is cleared to store zeros in order to prevent the processing of the same information more than once. The latter is effected by inhibiting the restoring of information appearing at the output of sense amplifiers 164 of FIGURE 3. The latter is effected by the non-activation of AND gate 182 due to the absence of the signal $\overline{\text{CLEAR}}$ being applied thereto. The $\overline{\text{CLEAR}}$ signal normally appears as an output of inverter 187; however, the inverter 187 which is adapted, at this time, to receive the subcommand signal CTFQ from the character processor 22 by way of OR gate 195 thereby inhibiting the generation of the signal $\overline{\text{CLEAR}}$.

The contents of the character location specified by address buffer 416 are read out to the B side input 448 of logical operator bus 450, gated onto line 460 for transfer to line address register 410 by way of AND gate 480 when activated by the subcommand signal FQ and timing signal T3.

With reference to FIGURE 1A, it is seen that the bits of information stored in section 11 is formatted such that the low order six bits of line address register 410 contains the line number involved (i.e. source of the character) while the high order two bits indicate the type of entry. Since, in the example given, the entry effected by the bit processor 20 was such as to indicate the storage of an assembled character for that line in its associated buffer character storage location of Section 9; the high order two bits are coded with a 01 configuration, indicating a character call for the particular line.

During the next cycle which is a FC cycle, the subcommand timing signal FC is generated as an output by the control sequence and priority logic 402 of FIGURE 5 when the following Boolean statement is met: FQ.FP.T7. During this cycle, the character order word stored in the character storage location of Section 8 of FIGURE 1A for that line is addressed and read out to the B side input 448 of the operator bus 450. The latter is effected by the transfer of the low order six bits of line address register 410 to address buffer 416 by way of AND gate 436 conditioned by a signal from inverter 440. Simultaneously therewith, there is a transfer of four bit code on line 414 which is generated by address encoder 412 upon the application of the subcommand timing signal FC thereto. The contents of the address location applied as an input to the B side input 448 by way of AND gate 446 when activated by the application of signal $\overline{\text{CT WRITE}}$ are transferred to line 460. The latter contents are transferred from the transfer bus to the character order register 406 by way of AND gate 466 when activated by subcommand timing signal FC and timing signal T3. The cycle is then terminated.

During the next cycle, the subcommand timing signal FB is generated as an output from control sequence and priority logic 402 when the following Boolean statement is met: FC.FP.T7. During this cycle, Section 7 of control memory 24 is addressed and the contents of the character storage location for that line is read out to the B side input of the operator bus. The latter is effected by transferring the low order six bits of line address register 410 by way of AND gate 436 to address buffer 416. Simultaneously therewith, there is the transfer of a four bit code specifying Section 7 of control memory 24 from line 414; the code is generated by address encoder 412 upon the application of subcommand timing signal FB thereto. The contents of the addressed character storage location for that line are read out to the B side input 448 of operator bus 450 by way of AND gate 446 and onto the line 460; the contents appearing on line 460 are transferred to auxiliary register 408 by way of AND gate 472 when activated by subcommand signal FB and timing signal T3.

During the FB cycle, control flip-flop 540 of FIGURE 6 is set to its one state thereby operative at that time to produce as an output, the signal RP. The latter is effected upon the activation of AND gate 542 by the application of the signals FB, $\overline{\text{M08}}$ and timing signal T5 thereto. The latter $\overline{\text{M08}}$ signal appears as an output from the high order end (8) bit position of the auxiliary register 408 which now stores the bit order for that line. In accordance with the word formating of FIGURE 1A, bit position 8 is set to a binary zero indicating the line is to operate in a receiving mode and therefore the signal $\overline{\text{M08}}$ is generated as an output therefrom. The cycle is then terminated.

During the next cycle in which the character processor 20 has access to memory, the subcommand timing signal FD is generated as an output from control secquence and priority logic 401 when the following Boolean statement is met: RP.FB.T7. During this cycle, the parallel buffer character storage location for that line within Section 9 of FIGURE 1A is addressed and the aforementioned data character (i.e. sync character) previously assembled and stored by bit processor 20 is read out to the B side input 448 of the logical operator bus 450. The latter is effected in part by the transfer of the low order 6 bits defining the line address for that line from line address register 410 by way of AND gate 436. Simultaneously therewith, there is a transfer on line 414 of the appropriate code specifying Section 9 of control memory 24 which is generated by address encoder 412 upon the application of subcommand timing signal FD thereto. The contents of the addressed character storage location are read out to the B side input 448 of the logical operator bus 450 by way of AND gate 446 and the latter signals appearing on line 460 are transferred from the transfer bus to data character register 404 by way of AND gate 462 which is activated by signals FD and T3. The cycle is then terminated.

During the next cycle, the subcommand signal SQ is generated as an output from control sequence and priority logic 402 of the character processor when the following Boolean statement has been met: FD.RP.T7. During this cycle, the C/B queue table section of control memory 24 corresponding to Section 12 of FIGURE 1A is addressed and the contents of the addressed character storage location is prevented from being transferred to the B side input 448 of operator bus 450 by the non-activation of AND gate 446 because of the absence of an output $\overline{CT}$ $\overline{WRITE}$ signal from inverter 552 of FIGURE 6. The latter inverter is not operative at this time to generate the signal $\overline{CT}$ $\overline{WRITE}$ due to the activation of OR gate 550 by subcommand timing signal SQ.

The addressing of Section 12 of control memory 24 is effected by the transfer of the 6 bit contents on line 434 of C/B counter 432 to address buffer 416 by way of AND gate 430 which is conditioned by subcommand signal SQ. Simultaneously therewith, an appropriate four bit code is transferred to address buffer 416 on line 414 which code is generated by address encoder 412 upon the application of subcommand signal SQ thereto. During this cycle, the 6 bit line address stored in line address register 410 is transferred to the A side input 452 of the operator bus 450 by way of AND gate 482 when the latter is activated by the subcommand timing signal SQ.

During the remainder of the SQ cycle, no input signals are applied to the B side input 448 with the exception of a signal on line B7. The latter signal is generated upon the activation of AND gate 554 of FIGURE 6 when such gate is fully conditioned by the application of the signals SQ, RP and T3 thereto. The bit configuration appearing on line 460 is seen to correspond to 01 in addition to a coded representation of the line number formated as shown in section 12 of FIGURE 1A. The signals appearing on the transfer bus are written into the address character storage location of Section 12 of control memory by proper activation of inhibit drivers 170. The latter transfer proceeds by way of data buffer 442, data buffer 166, AND gate 186, OR gate 180 and inverter 178. The latter AND gate 186 is activated at this time by the signals CTCHD and CT WRITE applied by way of AND gate 188 and OR gate 192.

This entry into memory storage section 12, effected by the character processor 22, is a call acknowledge entry which notifies the bit processor 20 that the character assembled by the bit processor has been removed from the parallel buffer storage section, which corresponds to Section 9 of FIGURE 1. In addition to effect the latter entry into Section 12 of control memory 24, the character processor 20 notifies the bit processor 20 of such entry by the setting of the bit to character interrupt control flip-flop 320 of FIGURE 4. The latter is effected by upon the application of the S.Q from the character processor 20. The cycle is then terminated. The bit processor 20 in a fashion similar to that described with respect to the character processor 20 is operative to reference the quene table section 12 during a subsequent FQ cycle for the processing of the character processor entry. The processor 20 then enters an FL cycle since the other portion of the Boolean statement FL=QP.$\overline{LA8}$.LA7.T7 has been met. The storage location storing the logic word for the particular line is referenced and the contents are read out to the B side of the bus and transferred by way of the AND gate 220 to the register 106. During a next cycle, the logic word is written back into the control memory 24 with bit 6 reset to a zero denoting the fact that the character processor 22 has removed from Section 9 for processing the previously assembled character for that line.

During the next cycle in which the character processor 22 has access to control memory 24, the subcommand timing signal FY is generated as an output from control sequence and priority logic 402 when the following Boolean statement is met: SQ.RP.T7. During this cycle, the special control character within the (sync) section corresponding to Section 10 of FIGURE 1A for that line is addressed. The special control character is read out to the B side input 448 of operator bus 450. The latter addressing is effected by the transfer of the low order 6 bits of line address register 410 on line 422 to address buffer 416 by way of AND gate 436. Simultaneously therewith, there is a transfer of the appropriate 4 bit code specifying Section 10 of FIGURE 1A on line 414. The bit code is generated by address encoder 412 upon the application of subcommand timing signal FY thereto.

The character stored in data character register 404 during the FY cycle is transferred to the A side input 452 of the operator bus 450 by way of AND gate 464 when conditioned by the application of subcommand signal FY thereto. The special control character or "sync" character is applied by way of AND gate 446 to the B side input 448. Both characters are compared at this time and since the character applied to the A side input 452 is a synchronization character, there is a favorable comparison therebetween and the signal SEZ, indicative of the favorable comparison, appears as an output on line 460. The latter signal is applied as an input to control sequence and priority logic 402. The signal SEZ, together with the signals RP, FY and T7 cause the activation of AND gate 514 which effects the setting of control flip-flop 512 to its set state which is then operative to produce as an output, the signal DEY. If the particular line under consideration had been coded as a start-stop line type, the signal $\overline{CO8}$ appears as an output from the character order register 406 in accordance with the formating of the character order word illustrated in FIGURE 1A. This signal together with the signal DEY from control flip-flop 512 causes the activation of AND gate 524 thereby producing a signal at the output thereof. The latter signal causes the set control flip-flop 516 to be set to its one state by way of OR gate 520. The control flip-flop is operative at this time to produce as an output, the signal YSC.

If, however, the line type corresponds to the synchronous line which requires only the recognition of a single special control character (sync), the control flip-flop 516 is set upon the generation of an output signal from AND gate 518. The activation of AND gate 518 is effected upon the latter being conditioned by the application of the signals RP, LA8, $\overline{LA7}$, SEZ and FY. The signals LA8 and $\overline{LA7}$ are transferred from line address register 410 and are coded so as to indicate line type. In either of the two previously mentioned line types, the control flip-flop 516 is set to its one state during the FY cycle. However, control flip-flop 516 is not set if the line type is one which is coded 11; 11 wherein such line requires the recognition of at least two successive special control (sync) characters. In this instance, the setting of the latter flip-flop 516 is only effected upon the activation of AND gate 522 when conditioned by the application of the signals DEY and BO4 thereto.

During the FY cycle when the particular line is a synchronous line the control flip-flop 528 is set by the generation of a signal at the output of AND gate 534 upon the application of the signals DEY and CO8 thereto. The cycle is then terminated.

During the next cycle, the subcommand timing signal SC is generated as an output of the control sequence and priority logic 402 when the following Boolean statement is met: FY.RP. During this cycle, the character order storage location of Section 8 of FIGURE 1 is addressed and the character order word for that line is prevented from being transferred to the B side input 448 of the operator bus 450 by the non-activation of AND gate 446.

The addressing of the character storage location of Section 8 is effected by the transfer of the six bits of the line address register 410 on line 422 to address buffer 416 by way of AND gate 436. Simultaneously therewith, the transfer of the appropriate four bit code configuration specifying Section 8 of control memory 24 on line 414 is effected, the latter signals being generated by address encoder 412 upon the application of subcommand timing signal SC thereto. During the cycle, the character order word contained within the character order register 406 is transferred from line 454 to the A side input 452 of operator bus 450 by way of AND gate 468 upon being conditioned to effect such transfer by the application of the subcommand timing signal SC thereto. The signals applied to the A side input 452 appear on line 460 unconditionally with the exception of bit 4 which is adapted to be set to a binary one by the application of an output signal from OR gate 458. The latter output signal is generated in accordance with the state of the control flip-flop 516 of FIGURE 6. If the latter flip-flop 516 has been set to its one state in a previous cycle, an output signal appears on line $S4_1$, thereby producing the aforementioned signal at the output of OR gate 458. This signal forces bit 4 appearing on line 460 to a binary one. The character order word bit configuration appearing at the output 460 is then transferred from the transfer bus to data buffer 442 and written into the addressed character storage location of control memory 24 for that line. However, since the line type, in this example, requires the recognition of at least two successive special control characters and only one such character has been received, bit 4 of the character order word is not set to a binary "one" at this time.

The next cycle is a SB cycle during which the bit order word location of memory is addressed and the information in that location is prevented from being read out to the B side input 460 of the operator bus 450. During this cycle the subcommand timing signal SB is generated as output from control logic 402 when the following Boolean statement is met: SC.T7. The addressing is effected in the manner previously described. The bit order word is written into the addressed location of control memory 24 at T3. Since the received data character compared favorably with the stored special control character in the prior FY cycle indicated by the setting of control flip-flop 528, a signal is generated on line S4 which forces bit 4 of the bit order word to a binary. The latter is effected by way of the AND gate 536 and OR gate 538 of FIGURE 6. The bit order word bit configuration appearing at the output 460 is transferred from the transfer bus to data buffer 442 and written into the addressed character storage location of control memory 24 for that line.

Bit processor 20 upon the subsequent referencing of the bit order word during an SL cycle, previously described, is operative to update the logic word (i.e. bit 4 to a binary one) in accordance with the bit order word. Since bit 4 of the logic word is set to a binary "one," the bit processor 20 thereby precluding further FY cycles is responsive thereto to make no further comparisons between the assembled bits of the character with the stored special control character for that line (i.e. the flip-flop 340 is reset by the application of a signal LN4).

Upon the receipt of the next character (second sync character) transferred to the data Buffer Section 9 of control memory 24 described, a comparison between the transferred character and the stored special control character is effected by a character processor during a subsequent FY cycle in the manner previously described.

Consequently, in the next SC cycle since there has been a second comparison therebetween, the signal appearing on line $S4_1$ forces bit 4 of the character order bit configuration to a binary one; the latter being effected in the manner previously described. More specifically, the flip-flop 516 is set upon the activation of the AND gate 522 when conditioned by the signals DEY and BO4. The signals YSC and SC condition the AND gate 526 to produce a signal on line $S4_1$. The character order word is transferred from the data bus and written into the address character storage location for that line.

During the next cycle, corresponding to a SB cycle, the bit order word location of memory 24 is addressed and the information in that location is prevented from being read out to the B side of the operator bus. Since the bit 4 of the character order word was previously set in the last SC cycle causing the setting of control flip-flop 516 indicative of the fact that the line was already "in sync," a signal is again generated on line S4 and bit 4 of the bit order word is again forced to a binary one.

If the second received character did not compare favorably with the stored special control character, effected in the manner previously described, during the aforementioned FY cycle, bit 4 of the character order word is not set during the SC cycle, the latter being inhibited by the occurrence of no signal on line $S4_1$, B7. In the subsequence SB cycle, bit 4 of bit order control word for that line is not forced to a binary one by the non-occurrence of an output signal on line S4. Since bit 4 of the bit order word is not set, the bit processor 20 is forced to again start comparing the assembled information bits with the stored synchronization character each time a bit is received from the corresponding bit buffer 16. In the instance when synchronization has been achieved, subsequently assembled characters (data characters) from the particular line are transferred by the character processor to ther main memory of the data processor 10 by way of the I/O data register 411 and AND gate 486. It will be appreciated that preliminary to each such data character transfer that an appropriate 18 bit address is loaded into the read/write channel assigned thereto during successively assigned memory cycles.

While, in accordance with the provisions of the statutes, there have been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new is:

1. Communication multiplexing means for assembling data bits into characters comprising:

bit processor means coupled to receive said data bits from a plurality of communication lines;

memory storage means;

control memory means including a plurality of addressable character storage locations, said control memory means including means for storing received data characters in a first group of said storage locations, means for storing control information in a second group of said storage locations, means for storing a different special control character corresponding to each of said lines in a first section of said second group of said storage locations; and means for storing a different order control character corresponding to each of said lines in a second section of said second group of said storage locations;

said bit processor means including means for scanning each of said lines at a frequency proportional to the rate at which bits occur on said line, means for assembling data bits received from said lines into characters, and means for transferring said assembled data characters to said first group of said storage locations; and character processor means coupled between said control memory means and said memory storage means, said character processor means including means for comparing an assembled character stored in said first group of said storage locations with the special control character corresponding to the line on which the bits of said assembled character were received, control means responsive to a true comparison of said compared characters to modify the order control character corresponding to said line which is stored in said second section, and second transfer means responsive to said modified order control character to transfer subsequently assembled data characters derived from said last-recited line to said memory storage means.

2. Communication multiplexing means for assembling data bits into characters comprising:

bit processor means for receiving said data bits from a plurality of communications lines;

memory storage means;

control memory means including a plurality of addressable character storage locations, said control memory means including means for storing said received data characters in a first group of said storage locations, means for storing control information in a second group of said storage locations, means for storing a different special control character corresponding to each of said lines in a first section of said second group of said storage locations, means for storing a different first order control character corresponding to each of said lines in a second section of said second group of said storage locations, and means for storing a different second order control character corresponding to each of said lines in a third section of said second group of said storage locations;

said bit processor means including means for scanning each of said lines at a frequency proportional to the rate at which bits occur on said line, means for assembling data bits received from said lines into characters, means for comparing the assembled bits of a character each time upon the receipt of a new bit from said line with the corresponding special control character for that line, first means for transferring said assembled data characters to said first group of said storage locations, and first control means coupled to said comparison means and to said first transfer means, said first control means being responsive to a first true comparison between the assembled character and said special character corresponding to said line to condition said transfer means for transferring said assembled character to said first group of said storage locations; and character processor means coupled between said control memory means and said memory storage means, said character processing means including means for comparing an assembled character stored in said first group of said storage locations with the special control character corresponding to the line on which the bits of said assembled character were received, second control means responsive to a true comparison of said compared characters to modify the first order control character corresponding to said line which is stored in said second section, said first control means being responsive to said modified first order control character to condition said first transfer means to transfer, without comparison, subsequently assembled data characters from said line to said first group of said storage locations; said character processor control means being responsive to said modification of said first order control character and to a true comparison between the next assembled character from said last-recited line and said special control character corresponding to said line, to modify the stored second order control character corresponding to said line which is stored in said third section, said character processor means further including second transfer means, said second transfer means being responsive to said modified second order control character to transfer subsequently assembled data characters derived from said first group of said storage locations to said memory storage means.

3. Communication multiplexing means for assembling data bits into characters comprising:

bit processor means for receiving said data bits from a plurality of communications lines;

memory storage means;

control memory means including a plurality of addressable character storage locations; said control memory means including means for storing said received data characters in a first group of said storage locations, means for storing control information in a second group of said storage locations, means for storing different special control characters corresponding to respective ones of said lines in a first section of said second group of said storage locations, means for storing different first order control characters corresponding to respective ones of said lines in a second section of said second group of said storage locations, and means for storing different second order control characters corresponding to respective ones of said lines in a third section of said second group of said storage locations;

said bit processor means including means for scanning each of said lines at a frequency proportional to the rate at which bits occur on said line, means for assembling data bits received from said lines into characters, means for comparing the assembled bits of a character upon the receipt of a new bit from said line with the corresponding special control character for that line, first means for transferring said assembled data characters to said first group of said storage locations, and first control means coupled to said comparison means and to said first transfer means, said first control means being responsive to a first true comparison between said assembled character and said special character corresponding to said line to condition said transfer means for transferring the received assembled data character from the last-recited line to said first group of said storage locations;

character processor means coupled between said control memory means and said memory storage means, said character processor means including means for comparing an assembled character stored in said first group of said storage locations with the special control character corresponding to the line on which the bits of said assembled character were received, second control means responsive to a true comparison of said compared characters to modify the first order control character corresponding to said line which is stored in said second section, said first control means being responsive to said modified first order control character to condition said first transfer means to transfer, without comparison, subsequently assembled data characters from said last recited line to said first group of said storage locations;

said character control means being responsive to the modification of said first order control character and to a non-comparison between the next assembled data character stored in said second group of storage locations and said special control character corresponding to said line to inhibit the modification of said second order control character corresponding to said line stored in said third section, said second control means including means responsive to said second order control character to return the stored modified first order control character corresponding to said line to its initial state prior to modification, said first control means being responsive to said first order control character, upon the return of the latter to its initial state, to condition said first transfer means for transferring subsequently assembled bits of a character which has a true comparison to the corresponding special control character corresponding to said line.

4. In combination with memory storage means and bit buffer storage means, said bit buffer storage means including a plurality of bit buffers, each adapted to store a bit of information received from, or for transmission to, a communications line and being operative to generate input and output request signals respectively indicative of the condition of said bit buffers;

multiplexing means for assembling said data bits from each of said bit buffers into characters for transfer to said memory storage means, said multiplexing means being coupled to said memory storage means and to said bit buffer storage means and comprising:

bit processor means for receiveing said data bits from said plurality of bit buffers;

control memory means comprising a plurality of line-addressable sections, each including a plurality of addressable storage locations, a first one of said sections being adapted to store data characters composed of said data bits received from each of said lines, a second section including separate character storage locations, each adapted to store a special control character corresponding to a different one of said lines, a third section including separate character storage locations, each adapted to store a first order control character corresponding to a different one of said lines;

said bit processor means including means for selecting storage locations in each of said first three sections, means for scanning each of said buffers at a frequency proportional to the rate at which bits are received from said lines, receiving means responsive to the concurrence of a request signal from one of said bit buffers upon the scanning thereof and a selected one of said first order control characters corresponding to a line when the latter order character indicates that line is in a receiving status, to accept data bits from said bit buffer, means for assembling said received data bits into characters from each of said bit buffers, and means for transferring said assembled data characters to selected ones of said character storage locations in said first section; and character processor means coupled to said control memory means, said character processor means including means for selecting storage locations in each of said recited sections, means for comparing an assembled character stored in a selected character location of said first section with the special control character stored in said second section corresponding to the line on which the bits of said assembled character were received, control means responsive to a true comparison of said compared characters to modify the stored second order control character corresponding to said last-recited line, said last-recited character having been selected from a storage location in said fourth section, control transfer means responsive to said modified second order control character to transfer subsequent data characters assembled from the line to said memory storage means.

5. The apparatus of claim 4 wherein said control memory means further include a fifth section adapted to be addressed for effecting the transfer of assembled data characters from said bit processor means to said character processor means, said section including a plurality of character storage locations adapted to store control characters consisting of a line address and control bits coded to indicate the reason for the storage of said character, said bit processor means including queue control means coupled to said selection means and responsive to said transfer of an assembled data charatcer to said first section to condition said selection means to select a character storage location in said fifth section, said queue control means including means for entering into said address storage location in line address corresponding to the line on which the bit of said assembled character were received and including means for loading said control bits for indicating such transfer, and means for generating a control interrupt signal for indicating the storage of said control character in said fifth section.

6. The apparatus of claim 5 wherein said character processor means further include queue control means responsive to said interrupt signal to condition said selection means for selecting the next character storage location in said fifth section, means responsive to the contents of said control character storage location to select a character storage location corresponding to the line address specified by said control character in said first section for subsequent transfer of the assembled data character corresponding to said last-recited line and stored in said last-recited location, to said memory storage means.

7. The apparatus of claim 6 wherein said control memory means further include a seventh section adapted to be addressed for effecting the transfer of acknowledgement signals from said character processor means to said bit processor means, said section including a plurality of character storage locations adapted to store control characters consisting of a line address and control bits coded for indicating the reason for the storage of said character, said character processor queue control means including means responsive to the control character stored in said seventh section for entering into one of said character storage locations of said seventh section the line address corresponding to the line on which the bits of said assembled character were received with said control bits modified to indicate an acknowledgment signal, and means for generating a control interrupt signal for indicating the storage of said control character in said seventh section.

8. The apparatus of claim 7 wherein said control memory means further include an eighth section, said section including a plurality of character storage locations adapted to store logic characters, corresponding to each of said lines, said bit processor queue control means includes means responsive to said character processor interrupt signal to condition said selection means for selecting the next character storage location in said fifth section, said selection means being responsive to the control character stored in said fifth section to select the character storage location corresponding to the line address specified by said control character in said eighth section of said control memory means, and means for modifying the control logic character for said line to indicate that the assembled data character for said line has been removed by said character processor means for transfer to said memory storage means.

9. The apparatus of claim 4 wherein said control memory means further include sixth section including character storage locations for storing line address characters corresponding to each of said lines, the frequency of occurrence of the different line addresses stored in the storage locations of said section varying in accordance with said bit receiving rate of said line, said bit processor means including counter means coupled to said selection means, said selection means being adapted by the contents of said counter means to select successive storage locations in said sixth section for scanning each of said buffers at a frequency proportional to the rate at which bits are received from said lines.

10. In combination with memory storage means and bit buffer storage means, said bit buffer storage means including a plurality of bit buffers, each adapted to store a bit of information received from buffer transmission to the communications line and being operative to generate input and output request signals respectively indicative of the condition of said bit buffers, multiplexing means for assembling said data bits from each of said bit buffers into characters for transfer to said memory storage means, said multiplexing means being coupled to said memory storage means and to said bit buffer storage means and comprising:

bit processing means for receiving said data bits from said plurality of bit buffers, control memory means comprising a plurality of line addressable sections each including a plurality of addressable storage locations, a first one of said sections being adapted to store data characters composed of said data bits received from each of said lines, a second section including separate character storage locations each adapted to store a different special control character corresponding to a different one of said lines, a third section including separate character storage locations each adapted to store a first order control character corresponding to a different one of said lines, a fourth section including separate character storage locations each adapted to store a second order control character corresponding to a different one of said lines;

said bit processor means including means for selecting storage locations in each of said first three sections, means for scanning each of said buffers at a frequency proportional to the rate at which bits are received from said lines, receiving means responsive to the concurrence of a request signal from one of said bit buffers upon the scanning thereof and a selected one of said first order control characters corresponding to said line when the latter order character indicates that said line is in a receiving status to accept data bits from said bit buffer, means for assembling said received data bits into characters from each of said bit buffers, means for comparing the assembled bits of a character upon the receipt of a new data bit from one of said bit buffers with the corresponding special control character for that line, first means for transferring said assembled data characters to said first section, and first control means coupled to said comparison means and to said first transfer means, said first control means being responsive to a first true comparison between said assembled data character and said special control character to condition said first transfer means for transferring said assembled data character into a character storage location in said first section; and character processor means coupled to said control memory means, said character processor means including means for selecting storage locations in each of said recited sections, means for comparing an assembled data character stored in a selected character storage location of said first section with the special control character stored in said second section corresponding to said line on which the bits of said assembled data character were received, second control means responsive to a true comparison of said compared characters to modify the first order control character corresponding to said line which is stored in said third section, said first control means being responsive to said modified first order control character to condition said first transfer means to transfer, without comparison, subsequently assembled data characters from said last-recited line to said first section, said second control means being responsive to said modification of said first order control character and to a true comparison between the next assembled character from said last recited line and said special control character corresponding to said line, to modify the second order control character corresponding to said line which is stored in said fourth section, said character processor means further including second transfer means, said second transfer means being responsive to said modified second order control character to transfer subsequently assembled derived data characters from said first section to said memory storage means.

11. In combination with memory storage means and bit buffer storage means, said bit buffer storage means including a plurality of bit buffers, each of said bit buffers being adapted to store a bit of information received from or for transmission to a communications line and being operative to generate input and output request signals respectively indicative of condition of said bit buffers, multiplexing means for assembling the data bits from each of said bit buffers into characters for transfer to said memory storage means, said multiplexing means being coupled to said memory storage means and to said bit buffer storage means and comprising:

bit processor means for receiving said data bits from said plurality of bit buffers;

control memory means comprising a plurality of line addressable sections, each including a plurality of addressable storage locations, a first one of said sections being adapted to store data characters composed of said data bits received from each of said lines, a second section including separate character storage locations, each adapted to store a special control character corresponding to a different one of said lines, a third section including separate character storage locations, each adapted to store a first order control character corresponding to a different one of said lines, and a fourth section including separate character storage locations, each adapted to store a second order control character corresponding to a different one of said lines;

said bit processor means including means for selecting storage locations in each of said first three sections, means for scanning each of said buffers at a frequency proportional to the rate at which bits are received from said lines, receiving means responsive to the concurrence of a request signal from one of said bit buffers upon the scanning thereof and a selected one of said first order control characters corresponding to a line when the latter order character indicates that said line is in a receiving status to accept data bits from said bit buffer, means for assembling said received data bits into characters from each of said bit buffers, means for comparing the assembled bits of a character upon the receipt of a new data bit from one of said buffers with the corresponding special control character for that line, first means for transferring said assembled data characters to said first section, and first control means coupled to said comparison means and to said first transfer means, said first control means being responsive to a first true comparison between said assembled data character and said special control character to condition said first transfer means for transferring said assembled data character from said last-recited line to said first section; and character processor means coupled to said control memory means, said character processor means including means for selecting storage locations in each of said recited sections, means for comparing an assembled data character stored in a selected character storage location of said first section with the special control character corresponding to the line on which the bits of said assembled data character were received, second control means responsive to a true comparison of said compared characters to modify the first order control character corresponding to said line which is stored in said third section, said first control means being responsive to said modified first order control character to condition said first transfer means to transfer, without comparison, subsequently assembled data characters from said last-recited line to said first section, said second control means being responsive to the modification of said first order control character and to a non-comparison between the next assembled data character stored in said first section and said special control character corresponding to said line, to inhibit the modification of said second order control character corresponding to said line stored in said fourth section, said second control means including means responsive to said second order control character to return the stored modified first order control character corresponding to said line to its initial state prior to modification, said first control means being responsive to said first order control character upon the return of the latter to its initial state to condition said first transfer means for transferring subsequently assembled bits of a character which has a true comparison to the corresponding special control character corresponding to said line.

References Cited

UNITED STATES PATENTS

| | | | |
|---|---|---|---|
| 3,373,418 | 3/1968 | Chan | 340—172.5 |
| 3,409,878 | 11/1968 | Lindinger et al. | 340—172.5 |
| 3,413,612 | 11/1968 | Brooks et al. | 340—172.5 |

RAULFE B. ZACHE, Primary Examiner